(12) United States Patent
Filippone

(10) Patent No.: US 12,387,854 B2
(45) Date of Patent: Aug. 12, 2025

(54) SHIELDED TRANSPORTABLE NUCLEAR REACTOR

(71) Applicant: Claudio Filippone, College Park, MD (US)

(72) Inventor: Claudio Filippone, College Park, MD (US)

(73) Assignee: CARBON FREE HOLDINGS LLC, Lewes, DE (US)

( * ) Notice: Subject to any disclaimer, the term of this patent is extended or adjusted under 35 U.S.C. 154(b) by 209 days.

(21) Appl. No.: 17/281,192

(22) PCT Filed: Sep. 27, 2019

(86) PCT No.: PCT/US2019/053585
§ 371 (c)(1),
(2) Date: Mar. 29, 2021

(87) PCT Pub. No.: WO2020/072320
PCT Pub. Date: Apr. 9, 2020

(65) Prior Publication Data
US 2021/0398704 A1    Dec. 23, 2021

Related U.S. Application Data

(60) Provisional application No. 62/737,882, filed on Sep. 27, 2018.

(51) Int. Cl.
*G21C 13/00*   (2006.01)
*G21D 1/00*    (2006.01)
(Continued)

(52) U.S. Cl.
CPC ............... *G21C 13/00* (2013.01); *G21D 1/00* (2013.01); *G21F 5/14* (2013.01); *G21C 1/30* (2013.01); *G21C 7/30* (2013.01)

(58) Field of Classification Search
CPC . G21C 13/00; G21C 1/30; G21C 7/30; G21C 21/00; G21D 1/00; G21F 5/14
(Continued)

(56) References Cited

U.S. PATENT DOCUMENTS

| 3,081,247 A * | 3/1963 | Balent .................. G21C 5/12 376/349 |
| 3,086,933 A * | 4/1963 | Nagey .................. G21C 7/10 376/909 |

(Continued)

FOREIGN PATENT DOCUMENTS

| WO | WO-2014043335 A1 * | 3/2014 | ............ G21C 13/02 |
| WO | WO-2016164935 A1 * | 10/2016 | ............ G21C 1/30 |

OTHER PUBLICATIONS

Filippone, "The Holos reactor: A distributable power generator with transportable subcritical power modules", pp. 1-49, (Jun. 25, 2017). (Year: 2017).*

(Continued)

*Primary Examiner* — Jack W Keith
*Assistant Examiner* — Daniel Wasil
(74) *Attorney, Agent, or Firm* — MILLBURN IP PLLC

(57) ABSTRACT

A transportable nuclear power generator unit is provided. The transportable nuclear power generator unit includes a container configured to be transportable by a vehicle, and nuclear power module disposed inside the container. The nuclear power module includes a sealed pressure vessel and a nuclear core disposed inside the sealed pressure vessel. The transportable nuclear power generator unit also includes a plurality of radiation shields provided at a plurality of interior walls inside the container to surround the sealed pressure vessel. The radiation shields are configured to shield radiation generated by the nuclear power module. The radiation shields include a movable shield configured to be (Continued)

movable between a position inside the container and a position on an exterior wall of the container.

7 Claims, 11 Drawing Sheets

(51) Int. Cl.
  *G21F 5/14* (2006.01)
  *G21C 1/30* (2006.01)
  *G21C 7/30* (2006.01)
(58) Field of Classification Search
  USPC .......................................... 376/260, 909, 912
  See application file for complete search history.

(56) References Cited

U.S. PATENT DOCUMENTS

| | | | | |
|---|---|---|---|---|
| 3,164,525 | A * | 1/1965 | Wetch | G21C 13/00 |
| | | | | 376/909 |
| 3,211,623 | A | 10/1965 | Tower | |
| 3,659,541 | A * | 5/1972 | Rigg | G21C 13/00 |
| | | | | 376/909 |
| 4,160,956 | A * | 7/1979 | Fader | H01S 3/09 |
| | | | | 376/356 |
| 4,355,001 | A * | 10/1982 | Pierart | G21C 13/00 |
| | | | | 376/909 |
| 4,749,541 | A | 6/1988 | Hardin, Jr. et al. | |
| 5,011,653 | A * | 4/1991 | Wachholz | G21C 1/07 |
| | | | | 376/287 |
| 2010/0290578 | A1 * | 11/2010 | Farrell | G21C 1/086 |
| | | | | 376/260 |
| 2013/0167531 | A1 | 7/2013 | Loewen et al. | |
| 2015/0357056 | A1 * | 12/2015 | Shayer | G21C 7/28 |
| | | | | 376/220 |
| 2016/0364989 | A1 | 12/2016 | Speasl et al. | |
| 2018/0019025 | A1 * | 1/2018 | Abbott | G21C 1/322 |
| 2018/0090237 | A1 | 3/2018 | Filippone | |
| 2018/0226159 | A1 | 8/2018 | Sterbentz et al. | |
| 2021/0210224 | A1 * | 7/2021 | Cisneros | G21C 7/28 |
| 2024/0304349 | A1 * | 9/2024 | Cella | G21D 1/00 |

OTHER PUBLICATIONS

Sikorin,. "Shipment of HEU Fuel from Pamir Reactor in Belarus to the Russia and Conversion to High Density LEU Fuel", In RERTR2011—33rd International Meeting on Reduced Enrichment for Research and Test Reactors, pp. 1-10, Oct. 2011. (Year: 2011).*

* cited by examiner

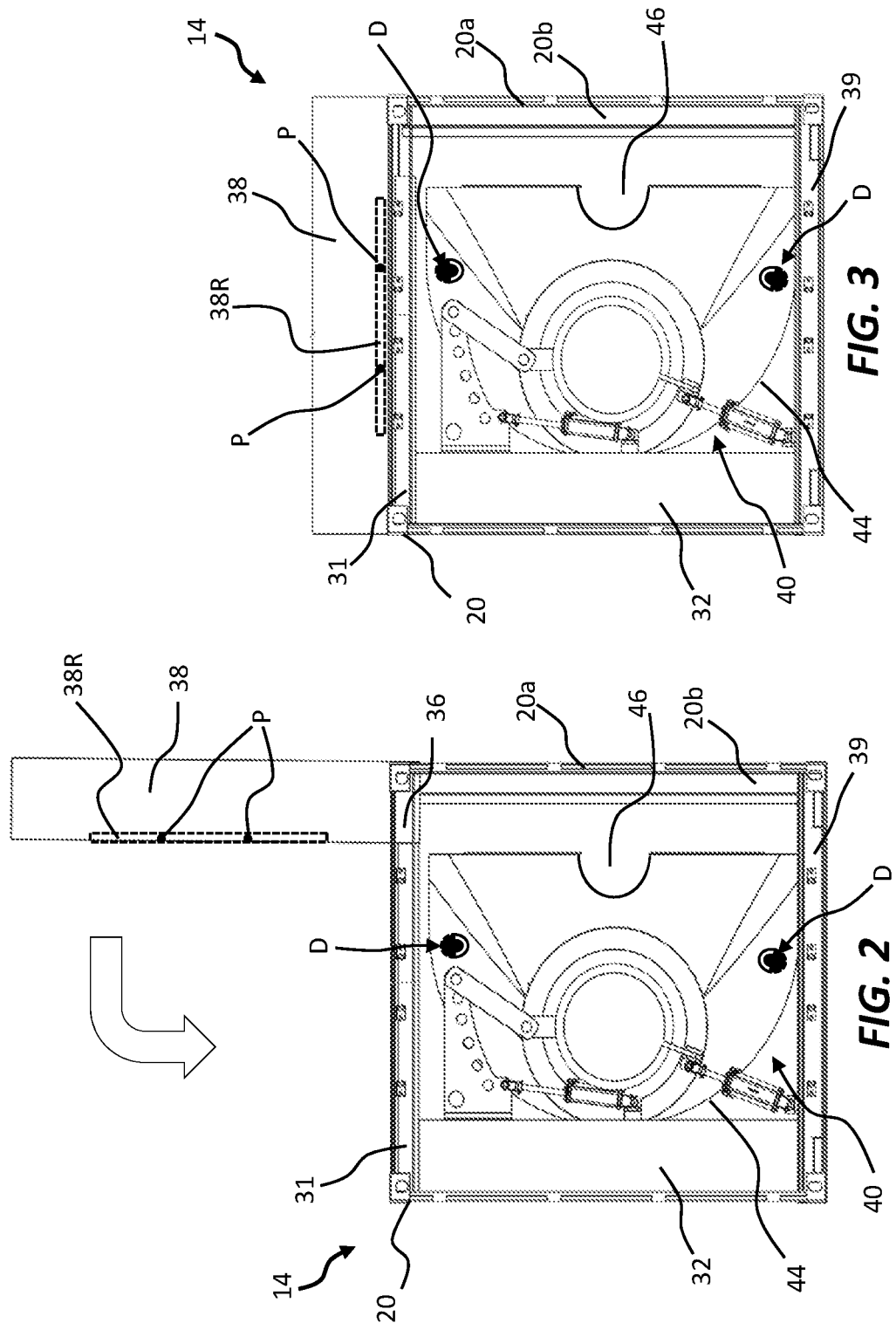

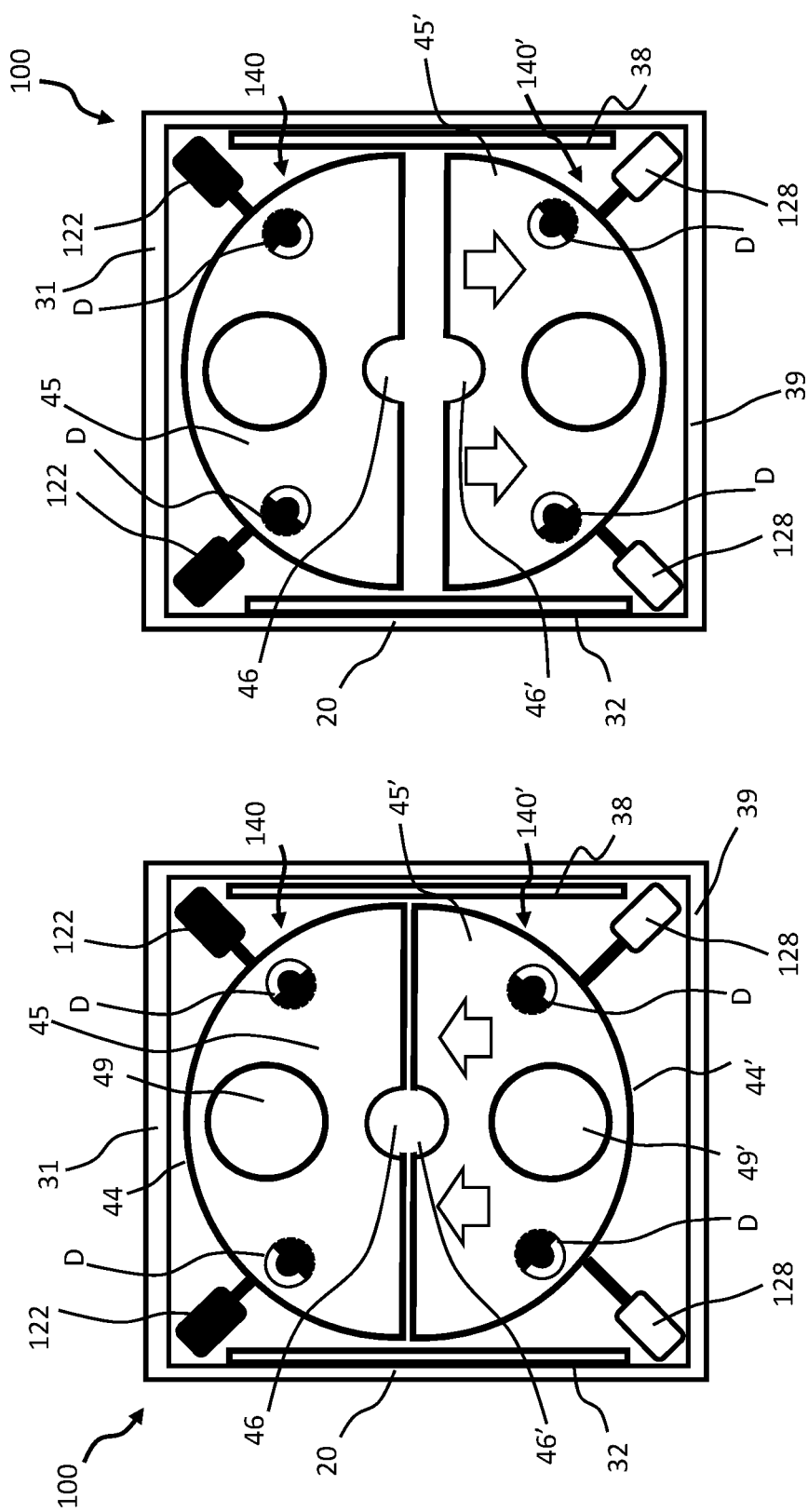

SHIELDED TRANSPORTABLE NUCLEAR REACTOR

CROSS REFERENCE TO RELATED APPLICATION

This application is a U.S. National Stage Application of PCT International Application No. PCT/US19/53585 filed on Sep. 27, 2019, which claims priority to U.S. Provisional Patent Application No. 62/737,882, filed Sep. 27, 2018, which is incorporated herein by reference in its entirety.

TECHNICAL FIELD

Various embodiments of the present disclosure relate generally to a nuclear reactor and, more particularly, to a transportable, micro, modular nuclear reactor including a transport container, components forming a power conversion system, and at least one radiation shield.

BACKGROUND

A nuclear reactor, such as a nuclear power generator, contains a nuclear core. When the nuclear reactor is used as a nuclear power generator, the nuclear core may be configured to produce thermal energy that may be converted into electricity by means of a power conversion system. When transported with nuclear fuel never operated (or "fresh fuel"), the radioactivity naturally produced by the nuclear fuel is low, and therefore, minimum or no shielding is required for transportation. However, after being shut down from periods of operations, the nuclear core becomes highly radioactive proportionally to the power history and the inventory of fission products accrued during operations. As the nuclear core becomes radioactive, shielding is required to reduce dose rates to safe levels for operators, the general public, and equipment operating in the proximity of the nuclear core and the environment.

A mobile (or transportable, movable) nuclear reactor (e.g., power generator) requires the elimination or simplification of the balance of plant (network of piping, valves, fitting and equipment necessary to execute the thermodynamic cycle of the power conversion system), such that the mobile nuclear reactor (e.g., power generator) may be fully contained within a transportable, shielded container (e.g., a shipping container equipped with radiation shields). Different configurations of mobile nuclear power generators including one or multiple vessels containing the nuclear core for producing thermal energy and the power conversion components for conversion of thermal energy to electrical energy are described, for example, in PCT International Application Nos. PCT/US16/27102, filed Apr. 12, 2016, PCT/US18/33979, filed May 22, 2018, PCT/US18/49282, filed Aug. 31, 2018, and PCT/US19/36425, filed Jun. 8, 2019, the disclosures of which are incorporated herein by reference in their entirety.

To attenuate radiation emitted by the nuclear core after operations, or at the end of the fuel life, and to enable transport of the nuclear reactor (e.g., power generator), radiation shields around the nuclear core are required. Radiation shields generally consist of solid or liquid radiation absorbing materials placed around the radiation source. To reduce radiation dose from a nuclear core, protective measures include increasing the time elapsed from shutdown to enable decay of short-lived radiation emitting isotopes, increasing distance from the radiation source and shielding, etc. To effectively reduce radiation dose rates at short distances from the nuclear source, heavy and relatively thick shields with high density materials are employed.

In a mobile nuclear reactor (e.g., power generator) contained within shipping containers with characteristics compliant with International Shipping Organization (ISO) standards, weight and dimensions of the radiation shields are constrained by dimensional and weight requirements enabling transport of the nuclear reactor (e.g., power generator) with standard transport vehicles. To ensure that the radiation dose rate sourced in mobile nuclear reactor (e.g., power generator) during transport is reduced to safe levels, additional radiation shields may be required. In some cases, to ensure safety, extra radiation shields may be placed outside of the container boundaries, which substantially increase transport challenges or inhibit transport of the shields and container altogether as the resulting assembly violates standard transport vehicles dimensional constraints. Therefore, conventional approaches to shielding radiation by adding materials or placing shields outside of the shipping container may not satisfy the container dimensional constraints and may not be suitable for use with mobile nuclear reactor (e.g., power generator) designs.

SUMMARY

In accordance with an aspect of the present disclosure, there is provided a transportable nuclear power generator assembly. The transportable nuclear power generator assembly includes a first modular nuclear power generator unit. The first modular nuclear power generator unit includes a first transport container. The first modular nuclear power generator unit also includes a first nuclear power module movably positioned inside the first transport container. The first modular nuclear power generator unit further includes a first supporting mechanism configured to support the first nuclear power module inside the first transport container. The transportable nuclear power generator assembly also includes a second modular nuclear power generator unit operably coupled with the first module nuclear power generator unit. The second modular nuclear power generator unit includes a second transport container. The second modular nuclear power generator unit also includes a second nuclear power module positioned inside the second transport container. The second modular nuclear power generator unit further includes a second supporting mechanism configured to movably support the second nuclear power module inside the second transport container. At least one of the first supporting mechanism and the second supporting mechanism is configured to move at least one of the first nuclear power module and the second nuclear power module relative to one another to result in an at least critical state or a subcritical state.

In accordance with an aspect of the present disclosure, there is provided a transportable nuclear power generator unit. The transportable nuclear power generator unit includes a container configured to be transportable by a vehicle. The transportable nuclear power generator unit also includes a nuclear power module disposed inside the container. The transportable nuclear power generator unit further includes a plurality of radiation shields provided at a plurality of walls inside the container, the radiation shields configured to shield radiation generated by the nuclear power module.

In accordance with an aspect of the present disclosure, there is provided a transportable nuclear power generator unit. The transportable nuclear power generator unit includes a container configured to be transportable by a vehicle. The transportable nuclear power generator unit also includes an upper nuclear power module and a lower nuclear power module vertically disposed in a stacked configuration inside the container. The transportable nuclear power generator unit also includes a coupler configured to mount the upper nuclear power module to an upper portion of the container. The transportable nuclear power generator unit further includes a movement actuator coupled to a lower portion of the container, and configured to support the lower nuclear power module and to move the lower nuclear power module upwardly toward the upper nuclear power module to result in an at least critical state.

Therefore, various embodiments of the present disclosure provide a mobile nuclear reactor (e.g., power generator) with radiation shields formed by a shipping container that houses a nuclear core. To attain the advantages in accordance with the purpose of the present disclosure, as embodied and described herein, one aspect of the present disclosure provides a shielded mobile (or transportable), modular nuclear reactor (e.g., power generator) wherein the radiation shields attenuate otherwise harmful radiation as the mobile nuclear reactor (e.g., power generator) is transported after periods of operations. There are multiple methods to achieve an at least critical state of the mobile nuclear reactor of the present disclosure. The "at least critical state" may include a critical state, a supercritical state (including a slightly supercritical state). The "at least critical state" may also refer to a thermal power and/or electric power production state. Criticality is a nuclear term that refers to the balance of neutrons in a nuclear system (e.g., a nuclear core). "Subcritical", or a subcritical state, refers to a nuclear system where the loss rate of neutrons from the system is greater than the rate of new neutrons being produced (e.g., by fission chain reactions), therefore the neutron population (or number of neutrons in the system) decreases as time goes on. "Supercritical" refers to a nuclear system where the production rate of neutrons is greater than the loss rate of neutrons and therefore the neutron population increases as time goes on. When the neutron population remains constant, this means there is a balance between neutron production rate and loss rate, and the nuclear system is said to be "critical," therefore critical means that the nuclear system (e.g. a nuclear core) is in a configuration that will allow it to operate at a steady power level. During operations, for example, to increase power level, the nuclear system may undergo an increase in reactivity, causing the rate of neutrons production to exceed the rate of neutrons loss until the system reaches a new critical state at a higher power level. As a result, during power increases the nuclear system may be slightly supercritical until the new power level is stabilized at a new critical state.

In one configuration the at least critical state may result from or be achieved by coupling multiple subcritical nuclear power modules including nuclear cores to form optimal geometries and satisfy fuel-moderator composition and mass requirements to sustain chain reactions for the production of thermal and/or electric power. In another configuration, the mobile nuclear reactor of the present disclosure may achieve an at least critical state by means of independent reactivity control mechanisms embedded with the reflector of the nuclear core as, for example, rotatable drums with neutron absorbers (e.g., neutron absorbing materials) on one portion of the drum and neutron reflectors (e.g., reflective materials) on the remaining portions of the drum. Additional reactivity control mechanisms within a sealed pressure vessel that houses the nuclear core may include control rods with actuators for their insertion/withdrawal. Alternatively, reactivity control mechanisms may be positioned outside of the sealed pressure vessel that houses the nuclear core as, for example, neutron absorber blades or pins positioned outside of the sealed pressure vessel that houses the nuclear core. Alternatively, the modular nuclear reactor may be formed by a monolithic nuclear core equipped with neutron control mechanisms (e.g., rotary drums with alternate portions formed by neutron absorbing materials and neutron reflective materials) to control the core reactivity in agreement with power demand. Whether the nuclear reactor is formed by a standalone nuclear power module with a nuclear core with reactivity controlled through actuation of components with neutron absorbing or neutron reflective materials, or the nuclear reactor is formed by independent nuclear power modules with nuclear cores neutronically coupled, it may be housed within one or multiple containers with radiation shields fitting within commercial shipping container dimensional constraints to enable transport for deployment, re-deployment after periods of operation, or retrieval for permanent disposal. Each modular nuclear reactor may include a power conversion system for converting thermal energy generated by the modular nuclear reactor into high-temperature process heat and/or electricity.

BRIEF DESCRIPTION OF THE DRAWINGS

The accompanying drawings, which are incorporated in and constitute a part of this specification, illustrate various embodiments consistent with the present disclosure, and, together with the description, serve to explain the principles of the present disclosure.

FIG. 2 is a schematic cross-sectional front view of the modular nuclear reactor unit shown in FIG. 1 with a movable shield retrieved from an interior of the container to be positioned on a top wall of the container, according to an exemplary embodiment consistent with the present disclosure.

FIG. 3 is a schematic cross-sectional front view of the modular nuclear reactor unit shown in FIGS. 1 and 2 with the movable shield positioned on the top wall of the container, according to an exemplary embodiment consistent with the present disclosure.

FIGS. 12 and 13 are schematic cross-sectional front views of a vertically aligned modular nuclear reactor unit, illustrating relative movements of nuclear power modules to couple the nuclear cores to achieve an at least critical state (FIG. 12) and to decouple the nuclear cores to achieve a subcritical state (FIG. 13), respectively, according to exemplary embodiments consistent with the present disclosure.

DETAILED DESCRIPTION OF THE EMBODIMENTS

Reference will now be made in detail to exemplary embodiments consistent with the present disclosure, examples of which are illustrated in the accompanying drawings. Wherever possible, the same reference numbers will be used throughout the drawings to refer to the same or like parts.

A person having ordinary skill in the art can appreciate that when the term "and/or" is used, the term describes a relationship between related items. The term "A and/or B" means three relationships may exist between the related items. For example, A and/or B can mean A only, A and B, and B only. The symbol "/" means "or" between the related items separated by the symbol. The phrase "at least one of A, B, or C" encompasses all combinations of A, B, and C, such as A only, B only, C only, A and B, B and C, A and C, and A, B, and C. The term "and/or" may be interpreted as "at least one of."

The term "transportable" used herein encompasses the situation where the modular nuclear power generator unit can be transported and deployed using a vehicle, such as a truck. In addition, the term "transportable" may also encompass the meaning of "movable." That is, the term "transportable" may also encompass the situation where the modular nuclear power generator unit is equipped with moving mechanisms (e.g., wheels) such that the modular nuclear power generator unit can be moved by another device (e.g., towed by a car or truck), moved by a person (e.g., driven by an operator), or can move automatically (e.g., through autonomous driving). The term "mobile" may be exchangeable with the term "transportable."

The term "nuclear reactor" may encompass any suitable nuclear reactor for any suitable purposes, such as for power generation (hence the nuclear reactor may be referred to as a nuclear power generator), for producing radioactive materials for other purposes, such as for medical use, for scientific studies, for other industrial use other than for power generation, etc.

Figure 1:
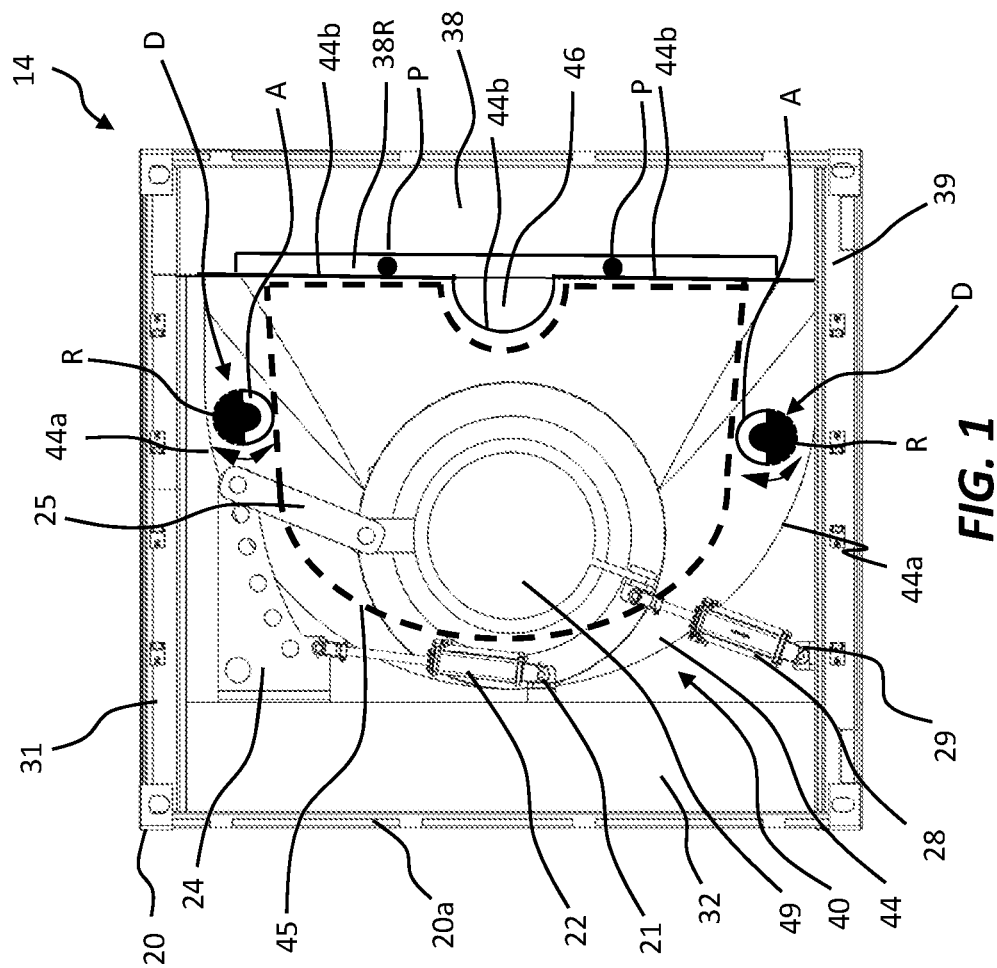
FIG. 1 is a schematic cross-sectional front view of a modular nuclear reactor unit with a front wall of a container removed to show components inside the container, according to an exemplary embodiment consistent with the present disclosure.

FIG. 1 illustrates a transportable (or mobile, movable), modular nuclear reactor (e.g., power generator) unit 14, according to an exemplary embodiment consistent with the present disclosure. In some embodiments, the modular nuclear reactor 14 may operate as a standalone unit, and the configuration shown in FIG. 1 may be a standalone configuration. In some embodiments, the modular nuclear reactor unit 14 may operate with a complementary modular nuclear reactor that may have similar structures and components as the modular nuclear reactor unit 14, and the configuration shown in FIG. 1 may be an undeployed state, or a transported state, a to-be-transported state, a storage state, etc. The term "undeployed state" may indicate that the nuclear reactor unit 14 is not yet deployed or operated for its intended purposes, such as to generate electricity.

For the convenience of discussion and for illustrative purposes, in the following descriptions, power generator is used as an example implementation of the nuclear reactor. Hence, the nuclear reactor unit 14 may be referred to as the nuclear power generator unit 14. The nuclear power generator unit 14 may include a transport container 20 (or referred to as container 20) and a nuclear power module 40 disposed inside the transport container 20. FIG. 1 is a cross-sectional front view of the modular nuclear power generator unit 14 with a front wall (or front door) of the container 20 removed to show components and structures inside the container 20. It is noted that in all drawings, regardless of whether the doors (front wall, back wall) are shown or not, it is understood that shielding may be provided at the doors. The shielding at the doors may include thickening the doors, adding a radiation shielding material to the doors, and/or providing radiation shields at the doors.

The container 20 may also be referred to as an intermodal container when multiple modular units similar to the nuclear power generator unit 14 are assembled to form a nuclear power generator assembly. With the container 20, the nuclear power generator unit 14 may be transported by conventional transportation means, such as, for example, trucks, freight rails, air-cargo, barges, ships and autonomous driving vehicles.

In some embodiments, the container 20 may be any suitable standard shipping container, such as the International Organization for Standardization (ISO) shipping container. The ISO shipping container may have predetermined dimensions according to the ISO specification. In some embodiments, the container 20 may be other types of containers, such as a customized transport container. A customized transport container may include customized dimensions, which may be determined based on the size/volume of the nuclear power module 40.

Although any type of transport container may be used for transporting the modular nuclear power generator unit 14, using the ISO shipping container may reduce the cost associated with manufacturing the customized container, reduce the cost associated with transportation due to the easy access to conventional transportation means (e.g., loading/unloading equipment), and increase the mobility and deployability because the ISO container can be transported and operated using various types of conventional transportation means and operational means (e.g., forklift, crane, lifting pallets, etc.).

As shown in FIG. 1, the container 20 of the modular nuclear power generator unit 14 may include a container frame 20*a*. The container 20 may include any suitable shape, such as a cuboidal shape, a cubic shape, a cylindrical shape, etc. In the embodiments shown in the drawings, a standard cuboidal shape is used as an example of the shape of the container 20. The container frame 20a may include walls (or doors) at the front, back, two sides, top, and bottom of the container 20, which are coupled with the container frame 20a to form a rigid structure suitable for transporting and protecting the nuclear power generator unit 14 disposed therein.

Because the nuclear power module 40 contains a nuclear fuel, it is beneficial to provide an adequate radiation shielding around the nuclear power module 40 to protect personnel involved in the operation or to protect the general public and the outside environment from radiation. For example, in some embodiments, the walls of the container 20 may be thickened and/or may be provided with radiation shields to reduce radiation transmitted out of the container 20 to the environment. For example, the nuclear power generator unit 14 may include a side shield 32 disposed along a longitudinal side wall inside the container 20, and a movable shield 38 disposed along an opposite longitudinal side wall inside the container 20. In some embodiments, the side shield 32 may be fixedly mounted to the side wall of the container 20. In some embodiments, the movable shield 38 may be fixedly mounted to the side wall opposite the side wall where the side shield 32 is mounted, or may be movably or removably mounted to the side wall opposite the side wall where the side shield 32 is mounted.

A top shield 31 may be disposed at the top wall of the container 20, and a bottom shield 39 may be disposed at the bottom wall of the container 20. In some embodiments, the top shield 31 may be part of the top wall (e.g., integrated with the top wall), and the bottom shield 39 may be part of the bottom wall (e.g., integrated with the bottom wall). In some embodiments, the top shield 31 may be separately disposed at the top wall and the bottom shield 39 may be separately disposed at the bottom wall. The nuclear power module 40 may be surrounded by radiation shields 31, 32, 38, and 39. With this configuration, radiation from a nuclear core 45 of the nuclear power module 40 may be adequately shielded, to increase the safety of personnel involved in the transportation or operation of the modular nuclear power generator unit 14.

The nuclear power module 40 may be mounted to the interior structure of the container 20. The nuclear power module 40 may include a nuclear core configured to generate nuclear fission chain reactions under certain circumstances (such as in an at least critical state). The nuclear power module 40 may generate thermal energy, which may be converted into electricity by a power conversion system described below. The nuclear power module 40 may produce nuclear radiation, which may be blocked or attenuated by the radiation shields, such as the top shield 31, the side shield 32, the movable shield 38, and the bottom shield 39.

In some embodiments, the nuclear power module 40 may be movably coupled with the container 20. As shown in FIG. 1, the nuclear power module 40 may be supported by a supporting mechanism disposed inside the container 20. The supporting mechanism may include at least one of a bracket actuator 22, a holding bracket 24, a swing arm 25, a main actuator 28, and a sliding connector 29. Although only one bracket actuator 22, only one holding bracket 24, only one swing arm 25, only one main actuator 28, and only one sliding connector 29 are shown in this cross-sectional front view, it is understood that the nuclear power generator unit 14 may include more than one for each of these components.

As shown in FIG. 1, the bracket actuator 22 may be fixedly mounted to the side shield 32 via a fixed anchor 21. The holding bracket 24 may be mounted to the side shield 32, and connected with the bracket actuator 22. As shown in FIG. 1, one end of the bracket actuator 22 may be fixed on the side shield 32, the other end of the bracket actuator 22 may be connected with the holding bracket 24. The bracket actuator 22 may support the holding bracket 24, and may be configured to drive the holding bracket 24 to move. In some embodiments, the holding bracket 24 may be fixedly mounted to the side shield 32. In some embodiments, the holding bracket 24 may be slidably mounted to the side shield 32 such that when the bracket actuator 22 is activated, the bracket actuator 22 may move the holding bracket 24 relative to the surface of the side shield 32.

For example, in the front view shown in FIG. 1, in some embodiments, when the holding bracket 24 is movably mounted to the side shield 32, the bracket actuator 22 may be activated to pull down or push up the holding bracket 24, causing the holding bracket 24 to move relative to the side shield 32. In some embodiments, the holding bracket 24 may be mounted on a sliding track (not shown) fixedly mounted to the side shield 32. The holding bracket 24 may slide along the sliding track when pushed or pulled by the bracket actuator 22. The holding bracket 24 may extend from the side shield 32 like a cantilever beam. An end of the holding bracket 24 that is not mounted to the side shield 32 may be connected with an end of the swing arm 25. The swing arm 25 may be pivotably connected with the holding bracket 24, and may swing, in a pendulum type motion, around the pivotal connection point on the holding bracket 24. Another end of the swing arm 25 may be pivotably connected with the nuclear power module 40. The swing arm 25 may support or hold the nuclear power module 40, and may swing, under the actuation of the actuators and the holding bracket 24, to cause the nuclear power module 40 to move, e.g., horizontally to the left or to the right. In some embodiments, the swing arm 25 may swing when the modular nuclear power generator unit 14 is under vibratory stresses or accelerations (e.g., during transport), causing the nuclear power module 40 to swing and eliminate or attenuate vibration-induced stresses.

A bottom portion of the nuclear power module 40 may be supported by the main actuator 28. One end of the main actuator 28 may be connected with the sliding connector 29 and the other end of the main actuator 28 may be connected with the bottom portion of the nuclear power module 40. The main actuator 28 may be slidably connected with the bottom wall of the container 20 through the sliding connector 29. A sliding track (e.g., sliding track 29a shown in FIG. 4) may be fixedly mounted on the bottom wall of the container 20, in the horizontal direction shown in FIG. 1 (i.e., the width or lateral direction of the nuclear power module 40). The sliding connector 29 may be connected with the sliding track 29a, and may move along the sliding track 29a (FIG. 4) in the left-right horizontal direction of the view shown in FIG. 1 (i.e., in a direction between the side shield 32 and the movable shield 38). When the sliding connector 29 moves along the sliding track 29a, the base position of the main actuator 28 may move. Actuating the main actuator 28 may cause the nuclear power module 40 to move both vertically and horizontally. In some embodiments, movement of the sliding connector 29 along the sliding track 29a may be controlled to move the base position of the main actuator 28 relative to the bottom wall of the container 20. In some embodiments, when the nuclear power module 40 swings, e.g., due to vibration, the swing motion may be damped or absorbed by the main actuator 28, the swing arm 25, the holding bracket 24, and/or the bracket actuator 22.

The bracket actuator 22 and the main actuator 28 may be any suitable actuators, such as hydraulic actuators, pneumatic actuators, electric actuators, piezoelectric actuators, etc. The bracket actuator 22 and/or main actuator 28 may be a linear or electromagnetic actuator configured to impart a linear, horizontal motion of a moving component in the bracket actuator 22 and/or the main actuator 28. Although not shown in FIG. 1, the supporting mechanism may include a controller, or, more broadly a control system for the control of reactivity proportionally to electric demand and other variables, coupled with the bracket actuator 22 and the main actuator 28, and configured to control these actuators. In some embodiments, the supporting mechanism may include multiple independent controllers to independently control different actuators (e.g., the bracket actuator 22 and the main actuator 28).

The nuclear power module 40 may include a sealed pressure vessel 44, which may be configured to contain various components of the nuclear power module 40, including, for example, a nuclear core 45. FIG. 1 shows the profile of the sealed pressure vessel 44 as seen from the front of the container 20. The sealed pressure vessel 44 includes an outer housing portion 44a and an inner housing portion 44b. The outer housing portion 44a may have a larger half-circle cross-sectional profile. The inner housing portion 44b may include a straight line profile with a smaller half-circle indented portion at the center of the larger half-circle profile. The smaller half-circle profile of the inner housing portion 44b may form a half-circle cavity 46, as shown in FIG. 1. The cavity 46 may be used for inserting certain material during operations. Correspondingly, at least one of the doors (e.g., front door and the back door that are not shown in FIG. 1) may include a matching circular (or half-circular) port that may be plugged during transportation and opened during operation. A circular (or half-circular) port on one door (e.g., the front door) may be connected to an on-line feeding system (not shown) configured for inserting a material to be irradiated. For example, the on-line feeding system may feed isotopes to be irradiated or push through rodlets-like capsules to be irradiated at one end (e.g., the front end) of the container 20. In some embodiments, the irradiated material may be retrieved from the same door through which the material is inserted into the modular nuclear power generator unit 14. In some embodiments, when the on-line feeding system is coupled to one door (e.g., a front door), the irradiated material may be retrieved from the other opposite door (e.g., a back door). For example, the circular (or half-circular) port provided on the other opposite door (e.g., the back door) of the container 20 may be used to extract or retrieve the irradiated isotopes or the rodlets-like capsules. It is understood that the shapes of the cross-sectional profile of the inner housing portion 44b and the outer housing portion 44a are illustrative, and can be other suitable shapes.

In FIG. 1, reference number 49 indicates an end of the nuclear power module 40. The swing arm 25 and the main actuator 28 may be connected to different portions (e.g., an upper portion and a lower portion) of the end 49 of the nuclear power module 40.

In some embodiments, with suitable design of the nuclear power module 40, the modular nuclear power generator unit 14 shown in FIG. 1 may operate as a standalone nuclear power generator with the sides of the container 20 being shielded with the top shield 31, bottom shield 39, side shield 32, and the movable shield 38. When the modular nuclear power generator unit 14 is a standalone power generator unit, the configuration shown in FIG. 1 may be referred to as a standalone configuration. In some embodiments, the modular nuclear power generator unit 14 may be configured to, for example, generate electricity based on nuclear fission chain reactions and thermal energy generated from the nuclear fission chain reactions. In some embodiments, the modular nuclear power generator unit 14 may be operated to produce a neutron flux to irradiate a material to be inserted into the cavity 46, for example, for medical use, for scientific study, or for other industrial use other than generating electricity and process heat. Here, the term "movable shield 38" generally indicates that the shield 38 is movable from its original location, unless specifically noted that it can nonetheless be fixed at its location. In this embodiment, when the modular nuclear power generator unit 14 is operated as a standalone unit, the "movable shield 38" may be movably or fixedly mounted to the side wall opposite the side shield 32. That is, depending on specific application, the movable shield 38 may not be moved or detached from its original location inside the container 20 shown in FIG. 1 before or during operation. The movable shield 38 may include a reflector 38R positioned at a surface of the movable shield 38 to face the nuclear core 45, for operation of the modular nuclear power generator unit 14 as a standalone power unit. When used as a standalone power generator unit, the modular nuclear power generator unit 14 may be configured to operate and provide electric power and process heat.

As shown in FIG. 1, the modular nuclear power generator unit 14 may include one or more reactivity control devices or mechanisms. The reactivity control devices may include one or more reactivity control drums D, and one or more neutron absorbing pins or rods P disposed in the reflector 38R to controllably decrease reactivity. In some embodiments, the reflector 38R may include holes or cavities of suitable shapes for insertion of one or more reactivity control devices, such as the neutron absorbing pins or rods P, or the reactivity control drums D, for example, when the nuclear power module 40 is to be controlled to result in a subcritical state. The neutron absorbing pins or rods P may be configured to absorb neutrons leaking out of the nuclear core 45, thereby decreasing the reactivity by reducing their reflection from reflector 38R back to nuclear core 45. The number of the neutron absorbing pins or rods P or control drums D included in the reflector 38R is not limited, and can be any suitable number. When the modular nuclear power generator unit 14 is in an at least critical state in which thermal power is produced and/or electricity is generated, the cavities in the reflector 38R may not be inserted with a reactivity control device, such as the neutron absorbing pin or rod P. Thus, the neutron absorbing pin or rod P may be inserted into the cavity or removed from the cavity at different stages of the operations of the modular nuclear power generator unit 14. For example, during transportation, the neutron absorbing pins or rods P may be inserted into the cavities of the reflector 38R to maintain the subcritical state of the nuclear power module 40.

Although two reactivity control drums D are shown in FIG. 1, it is understood that the number of the reactivity control drums D is not limited to two, which can be one, three, four, five, six, etc. Each reactivity control drum D may be rotatable around a center axis. Each reactivity control drum D may be fixedly mounted to a suitable location within the sealed pressure vessel 44 or outside of the sealed pressure vessel 44.

The reactivity control drum D may be configured to control the reactivity of the nuclear core 45. The reactivity control drum D may include or be formed by an absorber portion A having a neutron absorbing material (e.g., Boron based) to absorb neutrons and decrease the nuclear core reactivity of the nuclear core 45. The reactivity control drum D may include or be formed by a reflector portion R having a neutron reflecting material (e.g., Beryllium) so as to reflect neutrons leaking from the nuclear core 45 back to the nuclear core 45, thereby increasing reactivity of the nuclear core 45. For example, in some embodiments, a certain percentage (e.g., 30%) of the reactivity control drum D may be formed by the absorber portion A and a remaining percentage (e.g., 70%) of the reactivity control drum D may be formed by the reflector portion R. The ratio between the absorber portion A and the reflector portion R in the reactivity control drum D may be any suitable ratio, such as 1:1, 1:2, 1:3, etc., depending on core design requirements and actual application.

Multiple independent reactivity control drums D may be disposed on the periphery of nuclear core 45. The reactivity of the nuclear core may be controlled or regulated by rotating the reactivity control drums D to orientate the absorber portions A or the reflector portions R to face the nuclear core 45 at different, controlled angles. The independent reactivity control drums D and the neutron absorbing pins P included in the reflector 38R may be operated to maintain nuclear core 45 in a subcritical state, and an at least critical state (e.g., a supercritical state and any intermediate state) to fine-tune thermal power distribution and production inside the nuclear core 45.

By turning the reactivity control drums D to different angles such that different amount of the reflector portions R or the absorber portions A face the nuclear core 45, different power rating may be achieved in a controlled manner. In some embodiments, when the reactivity control drums D are rotated such that the absorber portions A of the reactivity control drums D face the nuclear core 45 at a predetermined angle, a subcritical state may be achieved. When the drums D are rotated such that the reflector portions R face the nuclear core 45 at a predetermined angle, an at least critical state may be achieved. In some embodiments, during an emergency situation, such as an earthquake or detection of an abnormal event, the reactivity control drums D may be controlled to shut down or reduce the nuclear reactivity of the nuclear core 45.

Although not shown in FIG. 1, it is understood that the modular nuclear power generator unit 14 may include one or more controllers operably coupled with the one or more reactivity control drums D to control the rotation of the reactivity control drums D. For example, based on a signal from a sensor detecting a command for increased or decreased electric power production (e.g., load following), or an abnormal event, the one or more controllers may rotate the reactivity control drums D such that the absorber portions A face the nuclear core 45 at a predetermined angle (or multiple predetermined angles) to reduce the reactivity of the nuclear core 45 to result in a subcritical state. The one or more controllers may control the one or more reactivity control drums D to rotate such that the reflector portions R face the nuclear core 45 at a predetermined angle (or multiple predetermined angles) to increase the reactivity of the nuclear core 45 to result in an at least critical state for production of power and process heat. In some embodiment, a single controller may control one or more reactivity control drums D. The one or more reactivity control drums D may be simultaneously controlled. In some embodiments, the single controller may independently control the one or more reactivity control drums D. In some embodiments, each reactivity control drum D may be operably coupled with a controller, and may be independently controlled by the controller. The one or more controllers may control the one or more reactivity control drums D and execute actuation (e.g., rotation of control drums D) in conjunction with commands from the controllers dedicated to position nuclear power module 40 to increase or decrease reactivity of nuclear core 45 when modular nuclear power generator assembly 10 is formed by two modular nuclear power generator units 14, 14' operably coupled together. The one or more controllers may control the one or more reactivity control drums D and execute actuation (e.g., rotation of control drums D) in conjunction with commands/instructions/data from the controllers dedicated to position nuclear power module 40 to increase or decrease reactivity of nuclear core 45 in conjunction with one or more controllers controlling one or more reactivity control drums D' and execute actuation (e.g., rotation of reactivity control drums D') in conjunction with commands/instructions/data from the controllers dedicated to position nuclear power module 40' to increase or decrease reactivity of nuclear core 45'. Similarly, the one or more controllers may control one or more neutron absorbing pins or rods P in conjunction with the controllers controlling the actuators to rotate the reactivity control drums D for standalone operations of the nuclear power generator unit 14 to result in a desired reactivity proportional to thermal power and electrical demand.

In some embodiments, to substantially increase nuclear fuel utilization (e.g., extended fuel life-cycle and increase effective full power years), the nuclear power generator unit 14 may be operated in combination with another complementary nuclear power generator unit to form a modular nuclear power generator assembly. In this embodiment, the configuration shown in FIG. 1 shows the modular nuclear power generator unit 14 in an undeployed state or a transport state. For example, the state shown in FIG. 1 may be a transport state in which the modular nuclear power generator unit 14 is being transported or to be transported, or may be an undeployed state in which the modular nuclear power generator unit 14 has arrived at the deployment site, but has not yet been deployed for operation. In this state, the movable shield 38 is disposed inside the container 20 along a side wall in a longitudinal direction of the container 20. When the modular nuclear power generator unit 14 is being deployed or to be operated, the movable shield 38 may be retrieved, moved, or removed from the inside of the container 20, as shown in FIG. 2. When the movable shield 38 is removed from its location inside the container 20, the performance and fuel utilization of the modular nuclear power generator unit 14 may be substantially enhanced when the modular nuclear power generator unit 14 is operated in combination with another complementary modular nuclear power generator unit, as described below. When used with the complementary modular nuclear power generator unit as a modular nuclear power generator assembly, the modular nuclear power generator assembly may be used to generate electricity using the thermal energy created from nuclear reactions. In some embodiments, as described below, the cavity 46 may be used for inserting a material that is to be irradiated by the neutron flux produced by the nuclear core 45 of the modular nuclear power generator assembly. The irradiated material may be for medical use, for scientific study, or for other industrial use other than generating electricity.

FIG. 2 shows a cross-sectional front view of the modular nuclear power generator unit 14 with the movable shield 38 removed from the interior of the container 20, to outside of the container 20, and being rotated or positioned on top of the exterior surface of the top wall of the container 20. The state shown in FIG. 2 is for the configuration where the modular nuclear power generator unit 14 is operated in combination with a complementary, similar modular nuclear power generator unit. In FIG. 2, the reference number 20b refers to a post for the door, which is removed for illustrative purposes. In some embodiments, when the modular nuclear power generator unit 14 is operated in combination with a complementary, similar modular nuclear power generator unit, the movable shield 38 may or may not include the reflector 38R and the neutron absorbing pin or rod P.

The removal of the movable shield 38 from the interior of the container 20 may be performed using any suitable means, such as a robot, a human operated machine, an automatic driving mechanism provided as part of the container 20, etc. For example, when the modular nuclear power generator unit 14 has been transported to a deployment site, and is ready to be deployed, the top wall of the container 20 may be at least partially opened (e.g., a section of the top wall may be openable) to either provide access to the movable shield 38 inside the container 20, or to allow the movable shield 38 to be moved (e.g., by a driving mechanism or some other devices) out of the container 20. In some exemplary embodiments, the container 20 may include a sliding door at the top wall for providing access to the movable shield 38. Once the top surface of the container 20 is opened, the movable shield 38 may be lifted up out of the container 20. Lifting of the movable shield 38 can be executed hydraulically or mechanically through mechanisms embedded with the structure of the movable shield 38, and/or the structure of the container 20. Alternatively, a crane or any other suitable lifting equipment may be used to lift the movable shield 38 and pivot it to rest on the top wall of the container 20 as shown in FIG. 3.

In some exemplary embodiments, the movable shield 38 and the container 20 may have a cooperating guide structure to guide and facilitate the movement of the movable shield 38 relative to the container 20. For example, the movable shield 38 may include one or more projections or rollers on its sides that mate with a track or a groove on the container 20, which may slidably engage with one another to facilitate the movement of the movable shield 38.

FIG. 3 shows a cross-sectional front view of the modular nuclear power generator unit 14 with the movable shield 38 positioned on the top wall of the container 20. The state shown in FIG. 3 is for the configuration where the modular nuclear power generator unit 14 is operated in combination with a complementary, similar modular nuclear power generator unit. After the movable shield 38 is lifted out of the container 20, the movable shield 38 may be rotated to be positioned horizontally on the top wall of the container 20, as shown in FIG. 3. In one exemplary embodiment, as shown in FIG. 2, an end 36 of the movable shield 38 may be pivotally engaged with the transport container 20 to facilitate the rotational motion between the movable shield 38 and the container 20. According to various exemplary embodiments, the movement of the movable shield 38 may be fully automated. For example, the movable shield 38 may be moved between the position shown in FIG. 1 to the position shown in FIG. 2, and to the position shown in FIG. 3 by a robot or machine executing one or more mechanical operations.

Figure 4:
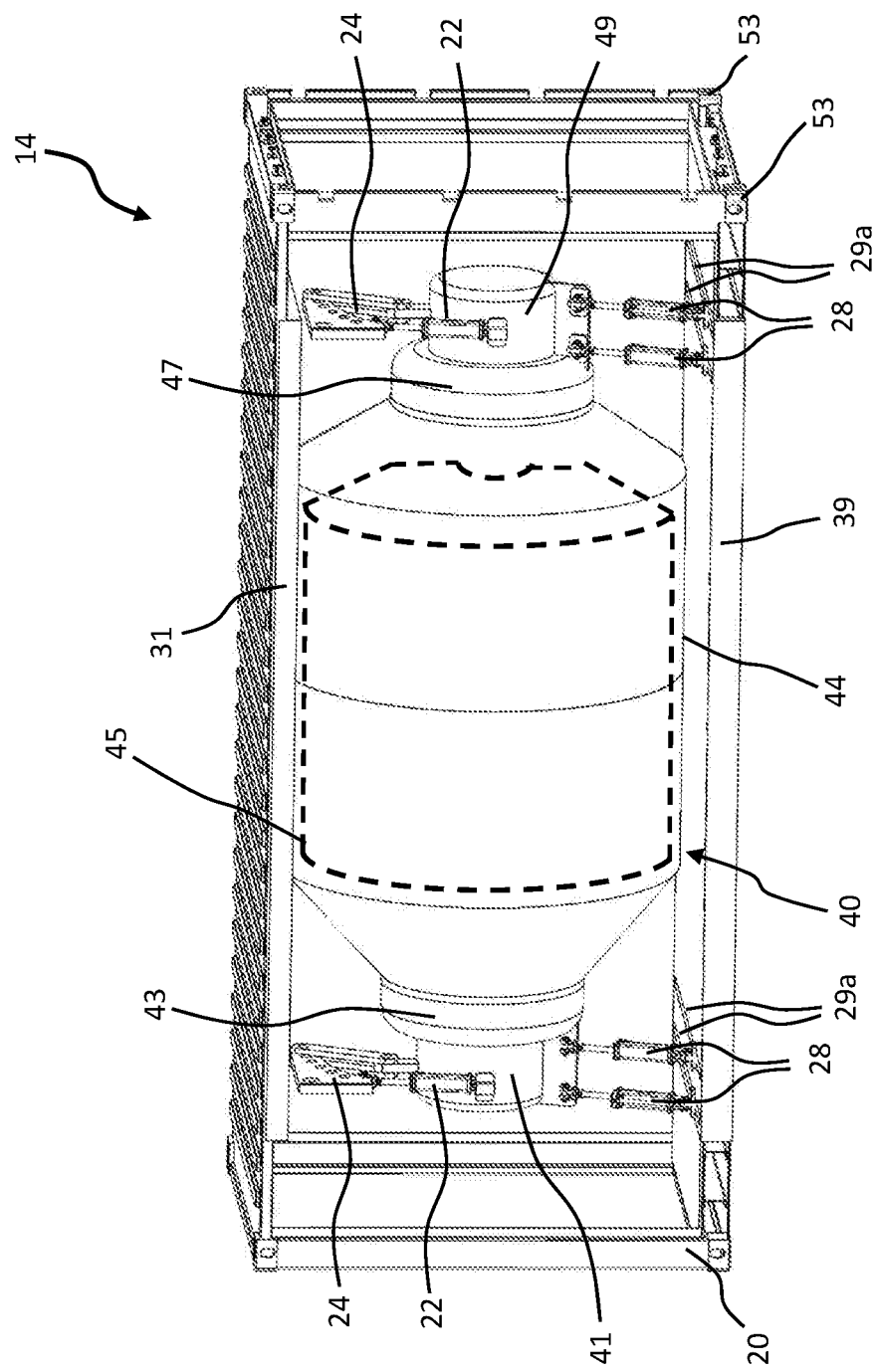
FIG. 4 is a schematic perspective view of the modular nuclear reactor unit shown in FIGS. 1-3 with a side wall, a side shield, and front- and back-doors removed to show components disposed inside the container, according to an exemplary embodiment consistent with the present disclosure.

FIG. 4 shows a perspective view of the modular nuclear power generator unit 14 with a side door (wall), the side shield 32, and the front- and back-doors removed to show the interior of the container 20. It is noted that the view in FIG. 4 is viewed from the left side in FIG. 1, so only the left side half-circle profile of outer housing portion 44a the sealed pressure vessel 44 is visible in FIG. 4, and the right side inner housing portion 44b of the sealed pressure vessel 44 on the side facing the movable shield 38 is not visible in FIG. 4. As shown in FIG. 4, the nuclear power module 40 may include a half semi-cylindrical shape. The nuclear power module 40 may include different segments or sections with different diameters. The center portion may have the largest diameter, and two ends 41 and 49 may have the smallest diameter. The nuclear power module 40 may be housed in the center portion of the sealed pressure vessel 44. As shown in FIG. 4, the supporting mechanism may include two holding brackets 24, two bracket actuators 22, two swing arms 25, and two pairs of main actuators 28 (each pair including two main actuators 28). The swing arms 25 may be connected to an upper portion of the ends 41 and 49, and the main actuators 28 may be connected to a lower portion of the ends 41 and 49.

Also shown in FIG. 4 are the two pairs of sliding tracks 29a (each pair including two sliding tracks 29a) mounted on the bottom wall (or bottom shield) 39 of the container 20, which are configured to be engaged with the sliding connectors 29 and the main actuators 28.

With the supporting mechanism shown in FIG. 4, the nuclear power module 40 may be operably coupled with the container 20 in a rotatable and movable manner, which enables the nuclear power module 40 to have a combined pendulum and horizontal motion. In some embodiments, in addition to providing support to the nuclear power module 40, the supporting mechanism may also be configured to move the nuclear power module 40 relative to a complementary nuclear power module of a complementary modular nuclear power generator unit. The motion and position of the nuclear power module 40 may be actuated and controlled by the supporting mechanism that includes the bracket actuators 22, the holding actuators 24, the swing arms 25, the main actuators 28, the sliding connectors 29, the sliding tracks 29a, and other structures disclosed herein. It is noted that the number of elements included in the supporting mechanism is only illustrative. Any suitable number of elements may be used depending on actual applications. For example, in some embodiments, at each end 41, 49, only one main actuator 28 may be provided, or more than two main actuators 28 may be provided.

As shown in FIG. 4, the nuclear power module 40 may include the nuclear core 45 disposed inside the sealed pressure vessel 44 and a power conversion system associated with the nuclear core 45, which may be integrated within the sealed pressure vessel 44. The nuclear power module 40 may include a suitable neutron reflector 42 (shown in FIG. 7) surrounding at least a portion of the nuclear core 45 inside or outside of the sealed pressure vessel 44. In some configurations, the neutron reflector 42 may include the reactivity control drums D or may be provided in addition to the reactivity control drums D. The power conversion system may include a closed-loop primary system for converting thermal energy generated by the nuclear core 45 into electricity and may include a turbo compressor 43 disposed near the end 41 and a turbo generator 47 disposed near the end 49. The turbo compressor 43 may be configured to compress a gaseous working fluid (e.g., air, $CO_2$, Helium, and gas mixtures), and the turbo generator 47 may be configured to expand the working fluid to convert the thermal energy of the working fluid to electricity by means of a turbine system coupled to an electric generator. A series of heat exchangers formed by the sealed pressure vessel 44 and thermally coupled to the side shield 32, the top shield 31, the bottom shield 39, and the movable shield 38, may close the working fluid loop to execute a Brayton thermodynamic cycle. Various features of a power module, consistent with the present disclosure, have been disclosed in, for example, PCT International Application Nos. PCT/US16/27102, filed Apr. 12, 2016, PCT/US18/33979, filed May 22, 2018, PCT/US18/49282, filed Aug. 31, 2018, and PCT/US19/36425, filed Jun. 8, 2019, the disclosures of which are incorporated herein by reference in their entirety. Accordingly, detailed description of various components of the nuclear power module 40 are omitted herein.

It is noted that in FIG. 4, the bracket actuators 22 are not mounted to the ends 41, 49. Rather, as shown in FIG. 1, the bracket actuators 22 are mounted to the side shield 32, which has been removed in the view shown in FIG. 4 to show the interior of the container 20.

Figure 5:
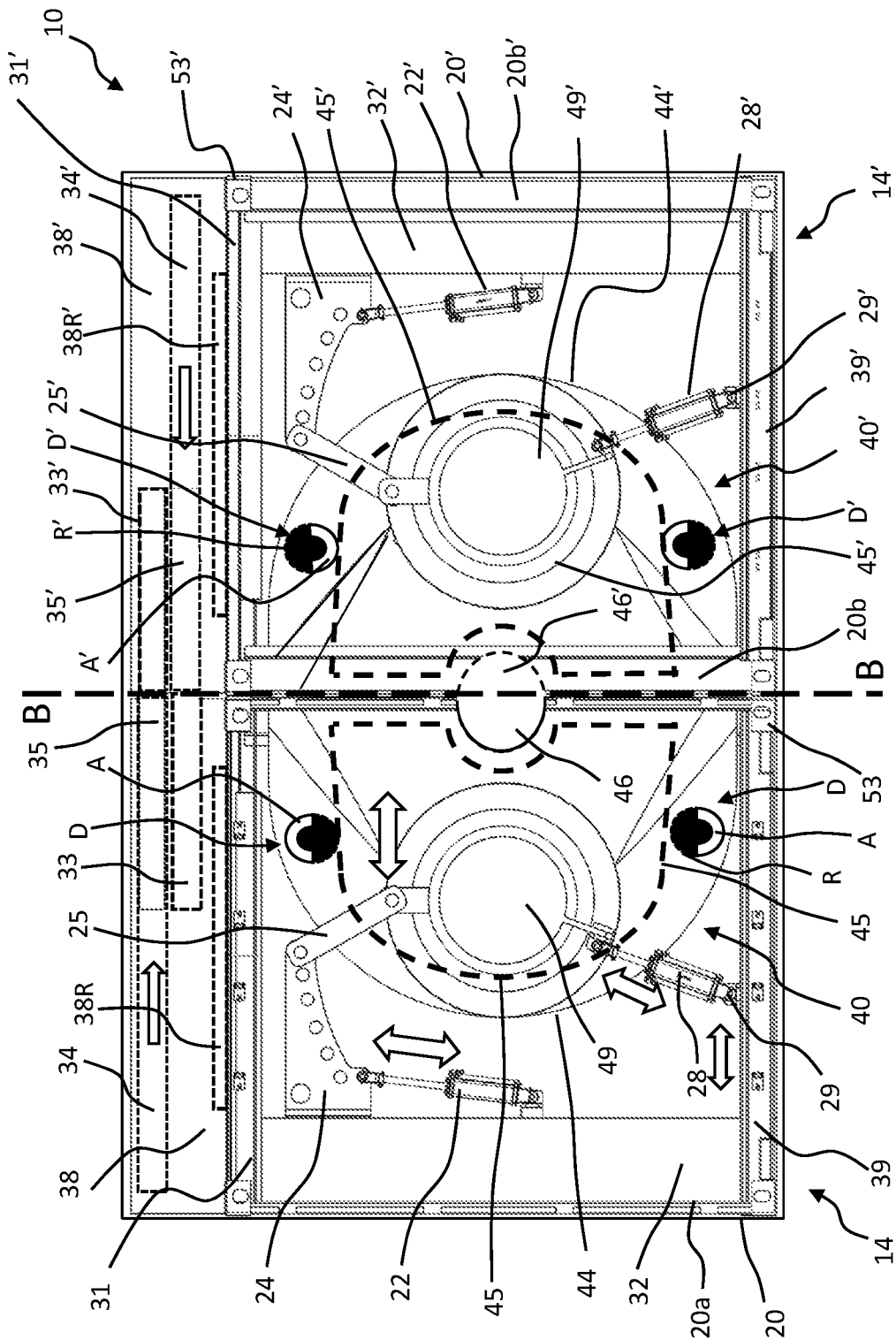
FIG. 5 is a schematic cross-sectional front view of a modular nuclear reactor assembly including two complementary modular nuclear reactor units disposed side by side horizontally, according to exemplary embodiments consistent with the present disclosure.

FIG. 5 shows a modular nuclear power generator assembly 10 that is formed by two modular nuclear power generator units 14, 14' operably coupled together. The modular nuclear power generator unit 14' is complementary to the modular nuclear power generator unit 14, and may have similar or same components as the modular nuclear power generator unit 14. The similar or the same elements included in the modular nuclear power generator unit 14' have the same reference number with a "'" (e.g., 14'). Descriptions of the similar or the same components included in the modular nuclear power generator unit 14' can refer to the descriptions of the corresponding components, which are not repeated for the purpose of simplicity. The components included in the modular nuclear power generator units 14, 14' are arranged such that when the modular nuclear power generator units 14 and 14' are arranged side by side (horizontally or vertically), their components are symmetric with respect to a coupling plane B-B. Although the horizontal arrangement is shown in FIG. 5, it is understood that the modular nuclear power generator units 14, 14' may be arranged in a vertical arrangement. In some embodiments, the components included in the modular nuclear power generator units 14, 14' may be different, as long as the difference does not affect the neutronic coupling of multiple nuclear cores 45 and 45'.

FIG. 5 shows the modular nuclear power generator assembly 10 in a deployed or operational configuration, where the movable shields 38, 38' have been removed from inside their corresponding containers 20, 20', and been positioned on top of the top walls of the respective containers 20, 20'. With the movable shields 38, 38' removed from the right side longitudinal wall of the container 20 and the left side longitudinal wall of the container 20', neutron coupling may occur between the nuclear power modules 40, 40' (or specifically, between the nuclear cores 45, 45'). The nuclear coupling may be blocked by the movable shields 38, 38' when the movable shields 38, 38' are disposed inside the containers 20, 20'. The movable shields 38, 38' disposed on the top wall of the containers 20, 20' may function to attenuate radiation emitted by the power modules 40 and 40' during normal and decay heat removal operations through the top walls, for example, the gap existing between the container 20 and the container 20' when they are arranged side by side horizontally. Although the reflectors 38R and 38R' are shown in FIG. 5 to be included in the movable shields 38, 38', it is understood that the reflectors 38R and 38R' may not be included in the movable shields 38, 38' in some embodiments. FIG. 5 also shows that each nuclear power module 40, 40' includes two reactivity control drums D or D', it is understood that any suitable number of reactivity drums may be included in the nuclear power modules 40, 40'.

As shown in FIG. 5, during normal and decay heat removal operations, the complementary modular nuclear power generator units 14, 14' may be coupled through corner fittings 53, 53', in accordance with standards for containers interoperability, as developed by the International Organization for Standardization (ISO). Each movable shield 38, 38' may include a first horizontal slot 33, 33' and a second horizontal slot 34, 34' that may be vertically arranged together. As shown in FIG. 5, in the movable shield 38, the first horizontal slot 33 is located under the second horizontal slot 34, whereas in the movable shield 38', the first horizontal slot 33' is located above the second horizontal slot 34'. In some embodiments, a length of the first horizontal slot 33, 33' may be shorter than a length of the second horizontal slot 34, 34'. The second horizontal slot 34, 34' may be configured to store a sliding shield 35, 35'. The sliding shield 35, 35' may be slidable into and out of the second horizontal slot 34, 34'. The sliding may be achieved through various types of control or driving mechanisms, such as an automated driving track that may move the sliding shield 35, 35' in and out of the second horizontal slot 34, 34'.

When the containers 20, 20' are coupled with the movable shields 38, 38' moved from inside of the containers 20, 20' to on top of the containers 20, 20', the first horizontal slot 33 of the movable shield 38 may face an opening of the second horizontal slot 34' of the movable shield 38' positioned at the same height. Likewise, the first horizontal slot 33' of the movable shield 38' may face an opening of the second horizontal slot 34 of the movable shield 38. When the sliding shield 35, 35' is moved out of the second horizontal slot 34, 34', the sliding shield 35, 35' may slide into the first horizontal slot 33, 33'. Therefore, the two movable shields 38, 38' may be coupled together by the sliding shields 35, 35'. The sliding shield 35 may be partially extending into the movable shield 38' and partially disposed inside the movable shield 38. Likewise, the sliding shield 35' may be partially extending into the movable shield 38 and partially disposed inside the movable shield 38'. Thus, the sliding shields 35, 35' overlap one another at the coupling plane B-B to shield radiation emitting from the gap between the containers 20, 20' when the nuclear cores 45, 45' included in the nuclear power modules 40, 40' are producing neutron fluxes (e.g., when in a critical or supercritical state). Safe shutdown margins are achieved under all nuclear core 45 and 45' configurations by actively or passively (and in some embodiments, independently) operating the reactivity control drums D and D', actuators 28 and 22, actuators 28' and 22'. Should the redundant, independent resilient reactivity control mechanism simultaneously fail and nuclear cores 45 and 45' be "jammed" together, the "Doppler" effect (e.g., broadening resonance caused by heating of the fuel) may cause negative reactivity insertion which naturally shuts down the nuclear cores 45 and 45'.

Figure 9:
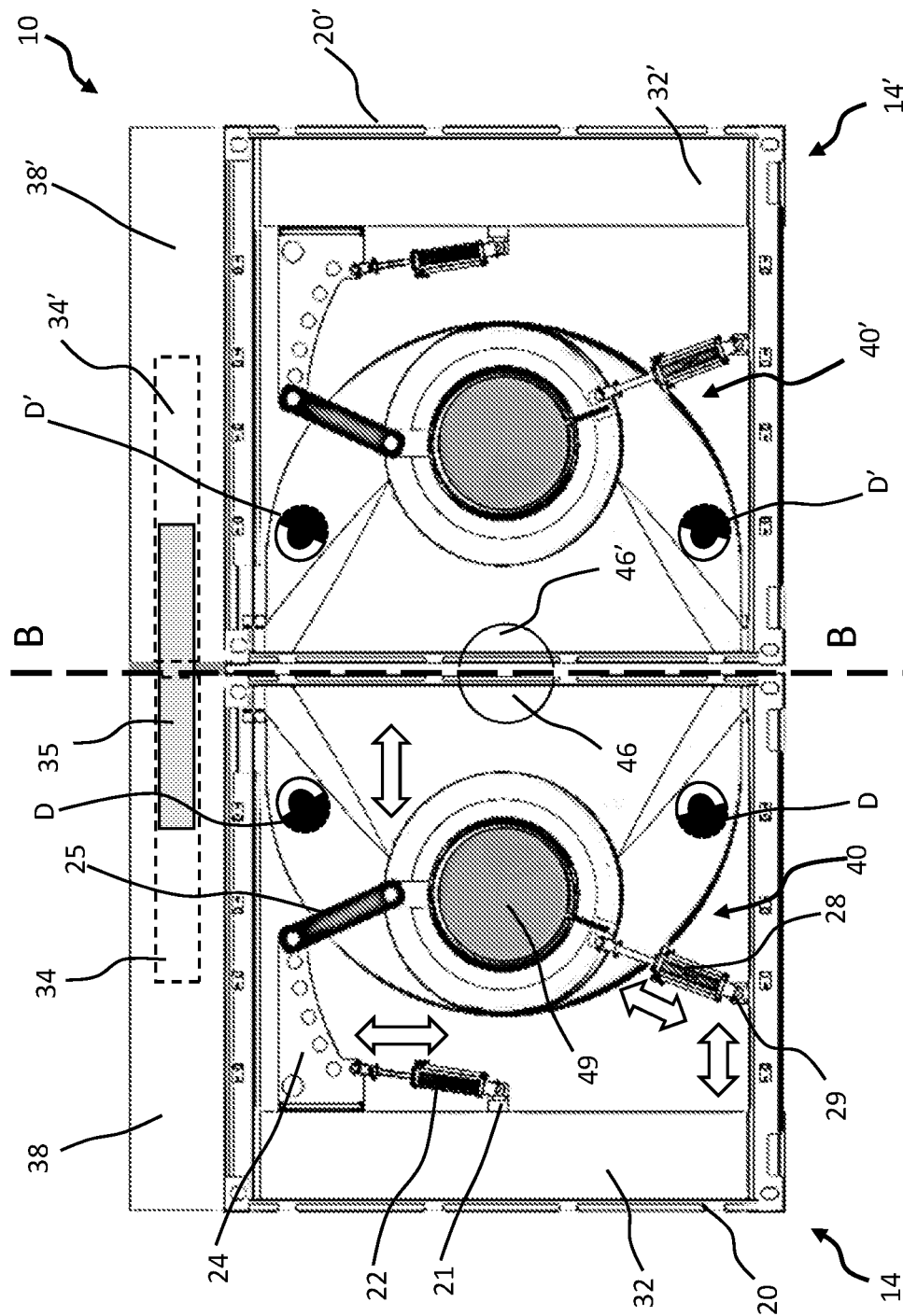
FIGS. 9 and 10 are cross-sectional front views of another embodiment of the modular nuclear reactor assembly with neutronically coupled nuclear cores to achieve an at least critical state (FIG. 9) and neutronically decoupled nuclear cores to achieve a subcritical state (FIG. 10), in which one sliding shield is provided in the movable shield, according to exemplary embodiments consistent with the present disclosure.
Figure 10:
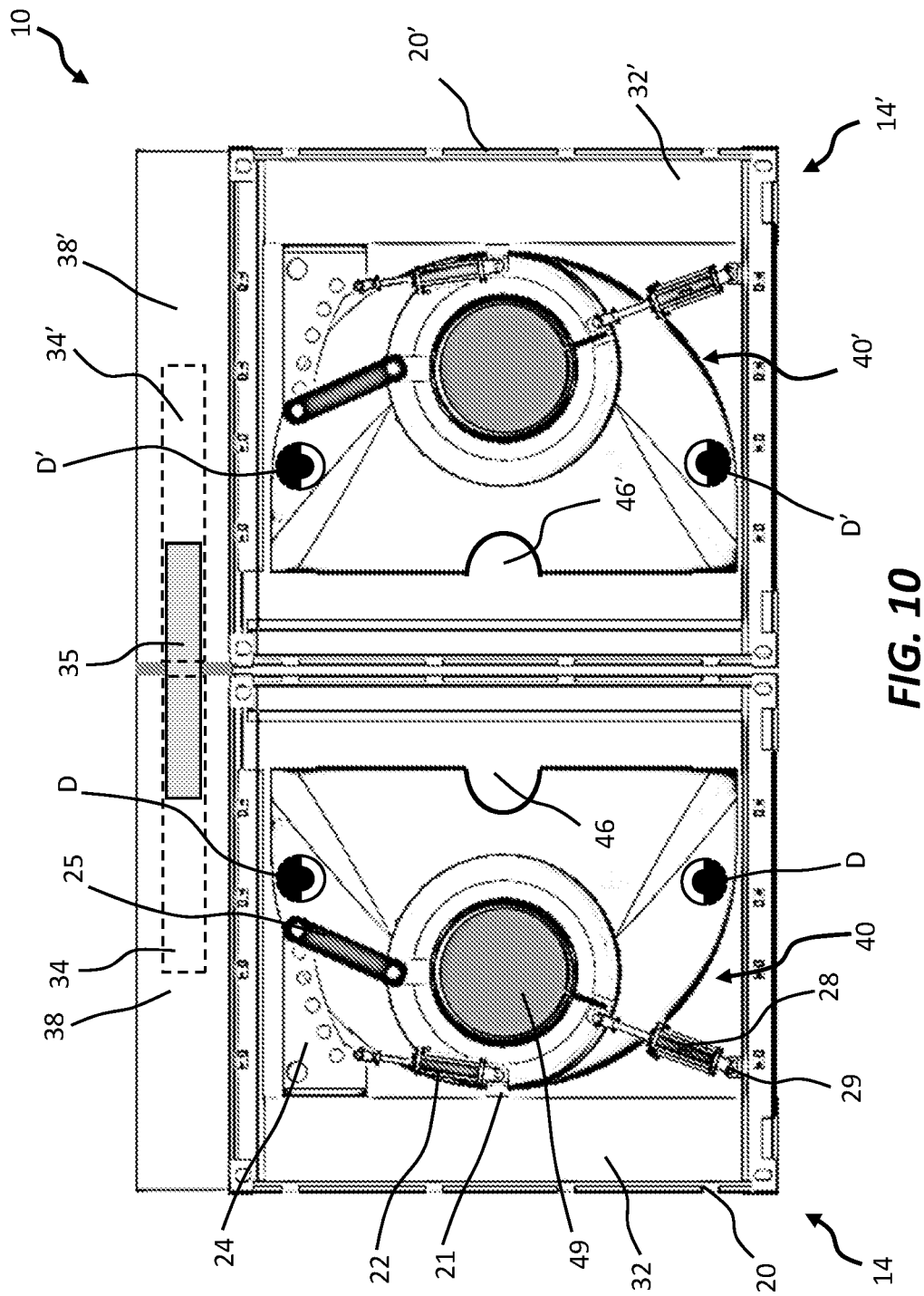

It is understood that the number of sliding shields 35 or 35' included in each movable shield 38, 38' may be any suitable number, such as one, two, three, four, etc. Correspondingly, the number of horizontal slots 33, 33', 34, 34' may match the number of the sliding shields 35, 35'. In some embodiments, only one of the movable shields 38, 38' may include the sliding shield 35 (or 35'), as shown in FIGS. 9-10, which may be extended to exist in both the movable shields 38, 38' so as to cover the gap between the containers 20, 20'. The movable shield 38, 38' may also include locking mechanisms (such as latches, locks, hooks, etc.) for locking the sliding shield 35, 35' in its position when the sliding shield 35, 35' is stored in the corresponding second horizontal slot 34, 34', and/or when the sliding shield 35, 35' is extended into the corresponding first horizontal slot 33, 33'.

As the modular nuclear power generator units 14 and 14' are coupled and the movable shields 38, 38' are positioned on the top wall of the modular nuclear power generator units 14 and 14', the combined shields formed by the side shields 32, 32' (in each modular nuclear power generator unit 14 and 14'), the deployed movable shields 38, 38', and the sliding shields 35, 35', along with the top shield 31 and the bottom shield 39, form a structure resilient to high-energy, high-speed impacts from accidental strikes or ballistic attacks, while providing radiation shielding. After operation of the mobile nuclear power generator units 14 and 14', the movable shields 38, 38' in the respective modular nuclear power generator units 14, 14' may be repositioned vertically and retracted into the positions inside the containers 20, 20', enabling radiation shielding during transportation of the modular nuclear power generator units 14, 14'.

When the modular nuclear power generator units 14, 14' are positioned side by side, as shown in FIG. 5, the nuclear power modules 40 and 40' may be actuated when they are moved close to one another as part of load-following operations. Load-following consists of actuating the power modules 40 and 40' against gravity to increase/decrease the core reactivity and the subsequent thermal power production in proportion to the electricity demand. Likewise, the nuclear power modules 40 and 40' can be actuated to regulate a thermal power rate to be transferred to a suitable working fluid to support applications requiring process heat. In some configurations, the nuclear power modules 40 and 40' may be configured to support both electrical load-following and process heat production. In some embodiments, actuation of the nuclear power modules 40 and 40' may be executed by moving them toward one another (i.e., toward the coupling plane B-B) through the supporting mechanism included in each container 20, 20' (which may include the swing arms 25, 25', the bracket actuators 22, 22', the main actuators 28, 28', etc., as described above). When the nuclear power modules 40 and 40' are moved toward one another, the nuclear power modules 40, 40' may become neutronically coupled with reactivity gradually increased to increase fuel utilization and power rating. The nuclear power modules 40, 40' (or the nuclear cores 45, 45') may transition from a subcritical state to an at least critical state (e.g., a critical state, a slightly supercritical state, or a supercritical state). As nuclear power modules 40, 40' are moved close enough to reach the at least critical state, thermal and/or electric power may be produced. The criticality state of the nuclear power modules 40, 40' may be controlled by varying the distance between the nuclear power modules 40, 40', and by controlling independent reactivity control mechanisms, such as the reactivity control drums D and/or the absorber pins P. When the nuclear power modules 40, 40' are moved away from one another, the neutronic coupling between nuclear power modules 40, 40' may gradually decrease, until the nuclear power modules 40, 40' become neutronically decoupled to achieve a subcritical state, in which state no electric power may be produced.

In some embodiments, actuation of the nuclear power modules 40 and 40' may be executed by rotating the reactivity control drums D. In some embodiments, the reactivity of the nuclear cores 45 and 45' of nuclear power modules 40 and 40' may be increased or decreased by a combination of moving them toward each other or away from each other and by controllably rotate the reactivity control drums D such that the reflector portions R and/or the absorber portions A may face the nuclear cores 45, 45'. In some embodiments, the reactivity control drums D may be controlled to fine tune in small increments or decrements the reactivity (e.g., fine tuning the electric power rating) after the nuclear power modules 40 and 40' have been moved close to or apart from each other to coarsely increase or decrease reactivity in larger increments or decrements.

In some embodiments, the modular nuclear power generator units 14, 14' may be individually transported to a deployment site and installed on a shielding platform (e.g., a reinforced concrete slab, a metal plate, a composite plate and slab) configured with suitable thickness and materials to attenuate radiation from the nuclear cores 45, 45' to the ground. At the deployment site, the modular nuclear power generator units 14 and 14' may be disposed horizontally with respect to one another, as shown in FIG. 4. The modular nuclear power generator units 14 and 14' may include a suitable interlocking mechanism associated with the container 20 configured to fixedly secure the modular nuclear power generator units 14 and 16. In some embodiments, the interlocking mechanism may include mechanical connectors coupled with ISO container, such as corner fittings 53 (e.g., corner connectors) and connectors mechanically coupling the nuclear power generator units 14 and 14' to the shielding platform to provide stability of the modular nuclear power generator units 14, 14' under seismic events. Although the present disclosure is described with modular nuclear power generator units 14 and 14' disposed horizontally, it should be understood that modular nuclear power generator units 14 and 14' may be disposed vertically (e.g., a stacked-up configuration), or at 90 degrees tilted, suitable, for example, for underground vertical positioning. For all of the deployment configurations, whether the complementary modular nuclear power generator units 14 and 14' are coupled horizontally, stacked-up, or vertically, the main actuators 28, the bracket actuators 22, the holding bracket 24, and the swing arm 25 may be configured to enable passive separation of the nuclear power modules 40 and 40' by gravity and induce a subcritical state upon loss of actuators power, or under off-normal operations or at an emergency situation.

As shown in FIGS. 1-5, the container 20, 20' may include side walls defining an interior space therein and the nuclear power module 40, 40' may be received inside the interior space. The side walls of the transport container 20 may include a suitable radiation shielding material. In addition to the side walls providing shielding, the modular nuclear power generator unit 14, 14' may include the side shield 32, 32' disposed inside the container 20, 20' on a longitudinal side that is away from the coupling plane B-B. The side shield 32, 32' may be stationary and fixed inside the transport container 20, 20'. As illustrated in more detail in FIGS. 1-3, the movable shield 38, 38' may be configured to be disposed inside the container 20, 20' during transportation or storage, and be disposed on the top wall of the transport container 20, 20' upon deployment and operation of the mobile nuclear power generator assembly 10. In addition to attenuate radiation from the operation and during decay heat of the nuclear core 45, 45', the side shield 32, 32', the movable shield 38, 38', as well as the top shield 31, 31' and the bottom shield 39, 39' may be configured to mitigate the consequences of kinetic events, for example, caused by linear and circular shaped charges or penetrators. In some embodiments, the side shield 32, 32', the movable shield 38, 38', and the top and bottom shields 31, 31', 39, and 39' respectively may be configured to attenuate/absorb radiation and ballistic impacts.

The supporting mechanisms included in the containers 20, 20' may be configured to move the nuclear power modules 40, 40' closer to one another or away from one another. The arrows shown in FIG. 5 indicate the directions of movement caused by various components, such as the bracket actuators 22, 22', the main actuators 28, 28', and the sliding connectors 29, 29'. Also shown in FIG. 5 is a half-circle cavity 46' formed by the inner housing portion of the sealed pressure vessel 44'. The half-circle cavities 46 and 46' may form a full-circle cavity. Similar to the front and back doors of the container 20, as described above, the front and back doors for the container 20' may also include circular or half-circle ports for receiving an insertion of a material into the cavity 46' to be irradiated and for retrieving the irradiated material. When the full-circle cavity is formed by the half-circle cavities 46, 46', the full-circle cavity may be used for inserting a material to be irradiated by the radiation generated by the nuclear cores 45, 45' of the nuclear power modules 40, 40' when they are radioactive. The full-circle cavity may also be used to insert and/or withdraw neutron absorbers (e.g., control rods), neutron sources (e.g., to start nuclear fission chain reactions), neutron boosters (e.g., additional enriched fuels), and instrumentation equipment. In some embodiments, both of the two supporting mechanisms included in the containers 20, 20' may be configured to move the nuclear power modules 40, 40' relative to one another to result in the at least critical state or the subcritical state. In some embodiments, only one of the two supporting mechanisms included in one of the two containers 20, 20' may be configured to move one of the nuclear power modules 40, 40' relative to the other one of the nuclear power modules 40, 40', which may be fixed in position.

Figure 6:
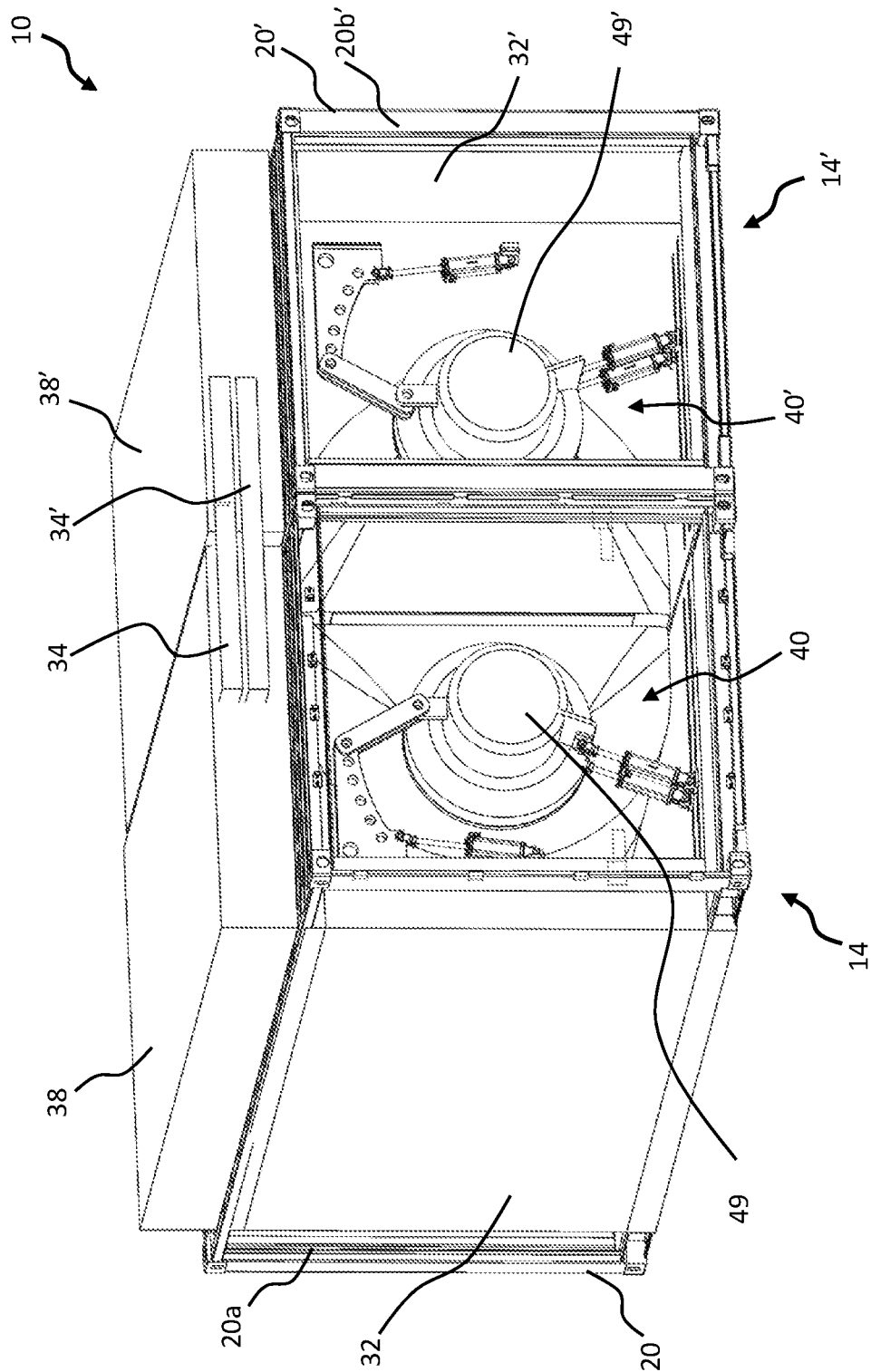
FIG. 6 is a schematic perspective view of the modular nuclear reactor assembly shown in FIG. 5, according to exemplary embodiments consistent with the present disclosure.

FIG. 6 illustrates a perspective view of the modular nuclear power generator assembly 10 shown in FIG. 5. The front doors of the containers 20, 20' have been removed to better illustrate the inside of the containers 20, 20'.

Figure 7:
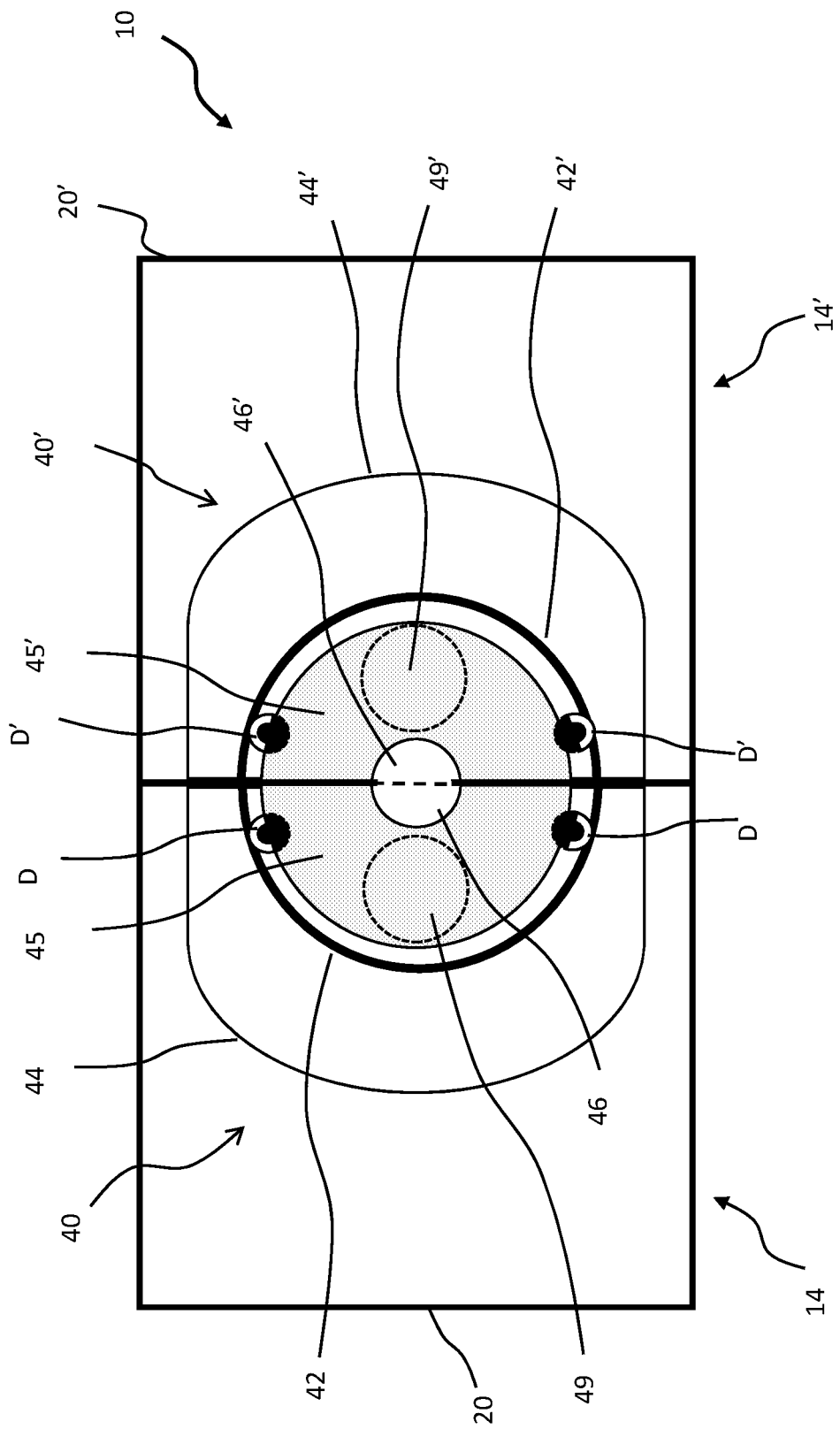
FIG. 7 is a schematic cross-sectional front view of the modular nuclear reactor assembly shown in FIG. 5, with two nuclear cores positioned close to one another to form neutronically coupled nuclear cores according to exemplary embodiments consistent with the present disclosure.
Figure 8:
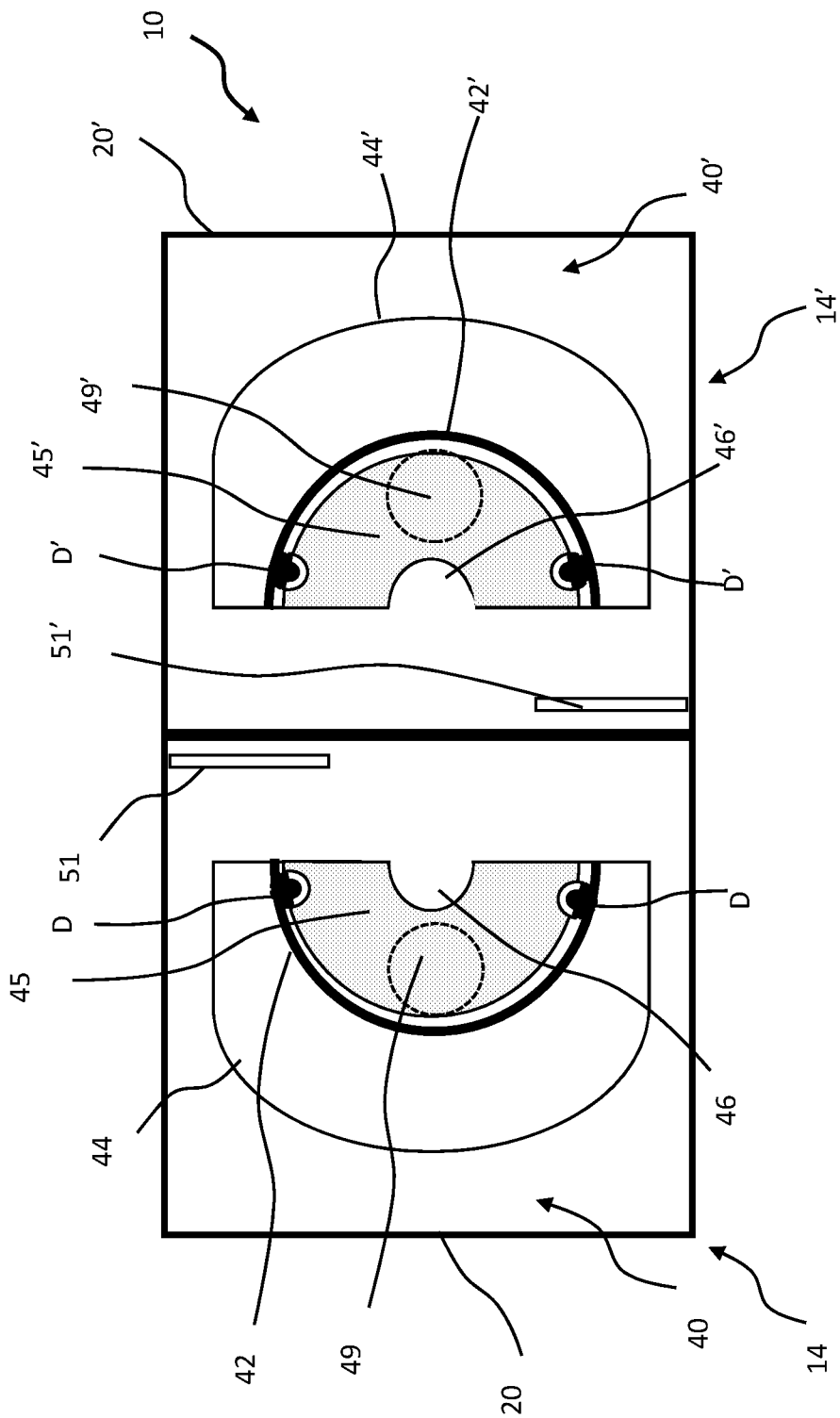
FIG. 8 is a schematic cross-sectional front view of the modular nuclear reactor assembly shown in FIG. 5, with two nuclear cores positioned away from one another to form neutronically decoupled nuclear cores according to exemplary embodiments consistent with the present disclosure.

FIGS. 7 and 8 schematically illustrate operations of the mobile nuclear power generator assembly 10, consistent with various exemplary embodiments of the present disclosure. For simplicity of illustration, the side shields 32, 32' and the movable shields 38, 38' are not shown. The nuclear power modules 40 and 40' may be configured to move relative to one another between a critical condition in which the nuclear power modules 40, 40' are positioned close to one another (shown in FIG. 7) and a subcritical condition in which the nuclear power modules 40, 40' are positioned away from one another (shown in FIG. 8). The movement of the nuclear power modules 40, 40' may be achieved through the supporting mechanisms described above, which may include the bracket actuators 22, 22', the holding brackets 24, 24', the swing arms 25, 25', the main actuators 28, 28', and the sliding connectors 29, 29', etc., or other supporting mechanisms enabling controlled movement of the nuclear power modules 40 and 40' with features enabling passive gravity-driven separation of power modules 40 and 40'. The at least critical condition or state may be achieved when the two nuclear cores 45, 45' are close to one another. The reactivity control drums D may be controlled to fine tune the reactivity such that the at least critical state is achieved. As shown in FIG. 8, when the nuclear cores 45, 45' are moved away from one another, the subcritical condition or state may be achieved. In some emergency situations, when the mechanical separation of the nuclear cores 45, 45' is hindered, the reactivity control drums D may be controlled to shut down or significantly reduce the reactivity of the nuclear cores 45, 45', forcing a subcritical state.

The nuclear power modules 40, 40' may each include the nuclear cores 45, 45', respectively, which may include a nuclear fuel (e.g., clusters of fuel blocks or fuel assemblies) arranged generally in a shape of a half cylinder or that of a half octagon or another suitable shape (not shown), such that when two nuclear power modules 40 and 40' are moved close to one another to result in the critical state or condition, nuclear cores 45 and 45' form a substantially cylindrical shape as shown in FIG. 7, or that of an octagon or another suitable shape (not shown).

As shown in FIG. 7, the nuclear cores 45, 45' (or the housing of the sealed pressure vessels 44, 44') may define a central cavity formed by half-circle cavities 46, 46' to allow passage of a suitable control mechanism or an instrumentation (e.g., a control rod, a neutron poison, a startup source, etc.) in and out of the nuclear core 45, 45'. Additionally, the central cavity formed by half-circle cavities 46, 46' may be configured to allow online radioisotope production via insertion of assemblies (e.g., capsules) containing isotopes to be irradiated with neutron fluxes moderated by a moderator utilized within the nuclear core 45, 45' (e.g., graphite, beryllium, etc.) through ports provided on the front doors of the containers 20, 20'. The radiated insertion may be withdrawn the central cavity through ports provided on the back doors of the containers 20, 20'.

In some embodiments of the present disclosure, the neutron flux crossing the central cavity (formed by 46, 46') may be further conditioned by equipping the central cavity with suitable neutron moderator materials. The central cavity may be configured to operate independently of the pressure boundary represented by the sealed pressure vessel 44, for example, at an atmospheric pressure, a low-pressure or in a vacuum. Alternatively, the central cavity may be utilized to execute nuclear reactor reactivity control by insertion/withdrawal of neutron absorbers. Reactivity control can also be achieved by inserting neutron absorbing blades 51, 51' (shown in FIG. 8) operated outside of the nuclear core 45, 45' and actuated so as to controllably absorb neutrons emitted from one complementary unit (e.g., 14) directed at the other complementary unit (e.g., 14') and vice versa between nuclear cores 45 and 45'.

Referring to FIGS. 4-5 and FIGS. 7-8, in some embodiments, the bracket actuator 22 may serve as an emergency safety mechanism. For example, when an abnormal operating condition is detected, the bracket actuators 22, 22' may be configured to retract so as to pull down the holding brackets 24, 24'. Pulling down the holding bracket 24, 24' may cause the nuclear power module 40 (and hence the nuclear core 45) to move away from the neighboring power module 40' (and hence the nuclear core 45') to result in a subcritical state with adequate shutdown margin. The holding brackets 24, 24' may also be configured to passively retract by gravity even when the holding brackets 24, 24' are malfunctioning. In some embodiments, only one nuclear power module 40 or 40' may be moved away from the other one in order to result in a subcritical state. In some embodiments, both of the nuclear power modules 40, 40' may be moved away from one another to result in the subcritical state. In some embodiments, the reactivity control drums D may be controlled to achieve the subcritical state without moving the nuclear power modules 40, 40' away from one another. In some embodiments, the sliding connectors 29, 29' when de-energized (e.g., emergency shutdown, malfunction or total loss of power), effectively enables the main actuators 28, 28' to passively slide due to gravity, thereby causing a gravity-driven "swing" of the nuclear power module 40 away from the neighboring nuclear power module 40' as shown in FIG. 8. In other words, when a predetermined condition is detected, such as an emergency shutdown, malfunction, or a loss of power, the nuclear power module 40, 40' may either be actively moved away from one another to force a subcritical state, or may swing, due to its own gravity, away from one another to force a subcritical state.

FIG. 7 shows an at least critical state configuration of the modular nuclear power generator assembly 10 in which two complementary nuclear power modules 40 and 40' have been moved to positions in close proximity to one another, and FIG. 8 shows a subcritical state in which the nuclear power modules 40 and 40' have been moved away from one another. To move the nuclear power modules 40 and 40' horizontally, the main actuators 28, 28' may be actuated (e.g., via a remote controller) to slide horizontally. The disclosed configuration in which the swing arms 25, 25' are rotatably connected to both of the holding brackets 24, 24' and the nuclear power modules 40, 40', and the holding brackets 24, 24' are slidable up and down along the side shields 32, 32' may allow the nuclear power module 40, 40' to move horizontally in an active manner or by gravity. For example, an operational procedure to bring the nuclear power modules 40 and 40' to controllably produce thermal energy (e.g., electricity) may include the following start-up and power production sequences:

rotation of the control drums D and D' to a position in which the absorber portions of drums D and D' face the nuclear cores 45 and 45' respectively so as to decrease reactivity of the nuclear cores 45 and 45' to induce a subcritical state of each of nuclear cores 45 and 45';

actuation of the nuclear power modules 40 and 40' to move them close to one another while reactivity in both nuclear cores 45 and 45' is maintained in a subcritical state (e.g., shutdown condition);

approach to critical, power generation and increase by proportionally rotating the reactivity control drums D to enable their reflector portions R to gradually face the nuclear cores 45 and 45'.

The configuration shown in FIG. 7 with the reflector portions R of drums D facing the nuclear cores 45 and 45' and the nuclear power modules 40 and 40' positioned to form a tightly coupled nuclear core, corresponds to the maximum reactivity insertion, which is normally executed toward the end of the fuel cycle when the fissile materials forming the nuclear cores 40 and 40' is burned out (e.g., spent fuel).

According to another exemplary aspect of the present disclosure, the modular nuclear power generator assembly 10 may include one or more emergency safety mechanisms that can be actuated automatically when an anomaly or a condition indicative of an accident condition or off-normal operation is detected. Such a safety mechanism may be configured to be fully operational without requiring an external power source.

In some embodiments, the main actuators 28, 28' may be configured to be actuated to move the nuclear power modules 40, 40' to result in a subcritical state shown in FIG. 8 when an abnormal condition is detected (e.g., uncontrolled reactivity insertion, temperature and/or pressure within the power conversion components exceeding threshold values, equipment malfunctioning, etc.).

In some embodiments, the nuclear power modules 40, 40' may be configured to automatically move by gravity to result in a subcritical state shown in FIG. 8 when the main actuators 28, 28' are decoupled from the containers 20, 20', respectively. Accordingly, the main actuators 28, 28' may be configured to be automatically decoupled from the containers 20, 20' when a predetermined abnormal condition is detected.

FIGS. 9-10 illustrate another embodiment of the modular nuclear power generator assembly 10 in an at least critical state (FIG. 9) and a subcritical state (FIG. 10), in which only one sliding shield 35 is provided. The sliding shield 35 may be stored either in the movable shield 38 or the movable shield 38', and may extend into a corresponding receiving horizontal slot 34 or 34' in the movable shield 38' or the movable shield 38 to cover the gap at the coupling plane B-B. It is understood that the movable shields 38, 38' may or may not include the reflector 38R, 38R'. As shown in FIG. 9, in the at least critical state, the reactivity control drums D may be controlled to rotate such that the reflector portions R face the nuclear cores (not shown) at certain angles relative to the nuclear cores. As shown in FIG. 10, in the subcritical state, the reactivity control drums D may be controlled to rotate such that the absorber portions A face the nuclear cores (not shown) at certain angles relative to the nuclear cores.

Figure 11:
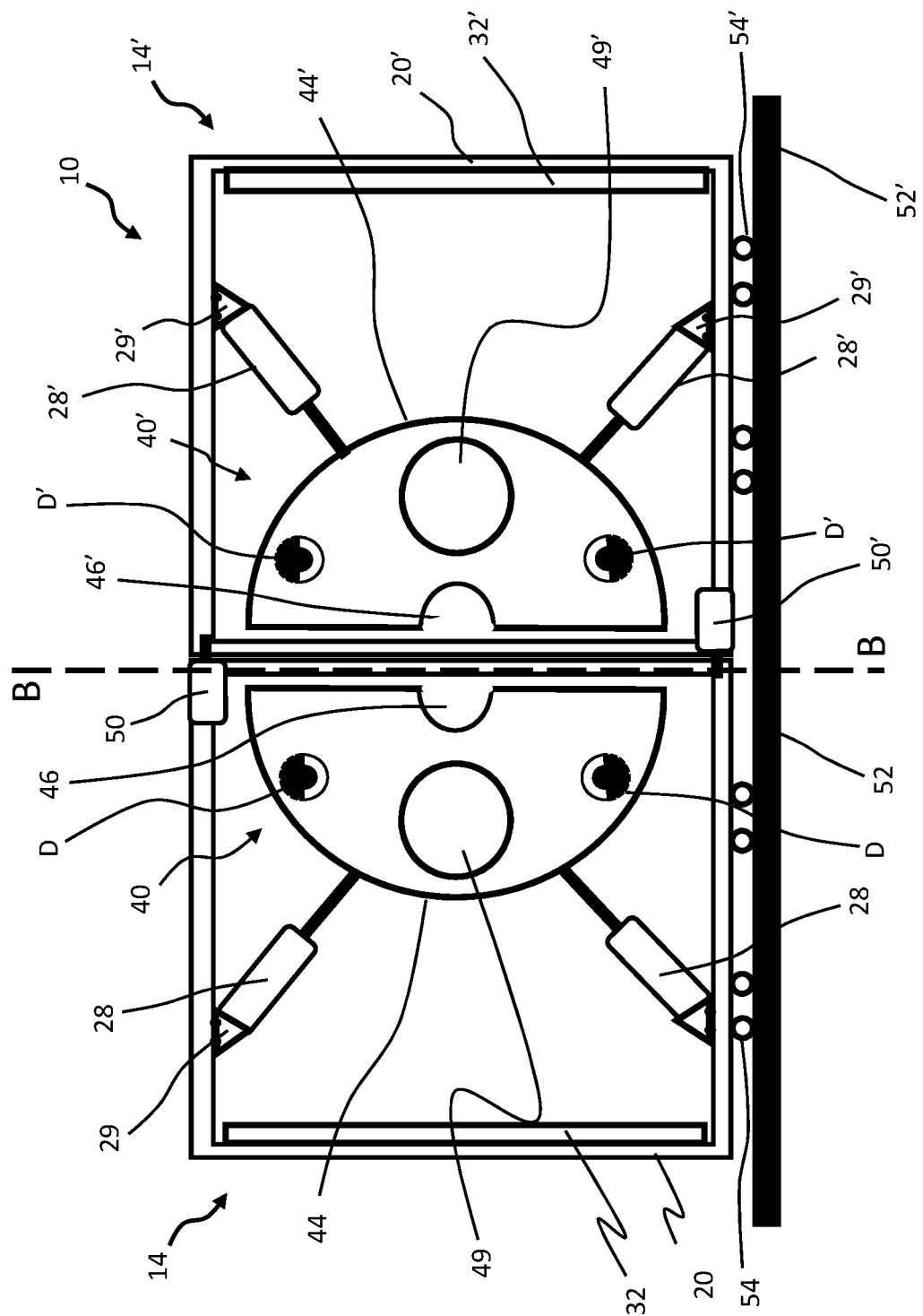
FIG. 11 is a schematic cross-sectional front view of the modular nuclear reactor assembly equipped with one or more actuators to move modular nuclear reactor units away from one another to neutronically decouple the nuclear cores and force a subcritical condition, according to an exemplary embodiment consistent with the present disclosure.

FIG. 11 illustrates another embodiment of the modular nuclear power generator assembly 10. For simplicity of illustration, only the side shields 32, 32' are shown in FIG. 11, and the movable shields 38, 38' are not shown. It is understood that the modular nuclear power generator assembly 10 shown in FIG. 11 may also include the movable shields 38, 38', as shown in other embodiments. In addition to or as an alternative of the safety mechanism described above in connection with FIGS. 1-10, which can separate the nuclear power modules 40, 40' in case of emergency, or when a subcritical state is desired, the modular nuclear power generator 10 may include one or more separation actuators 50, 50' disposed on the containers 20, 20'. The separation actuators 50, 50' may be configured to push the containers 20, 20' away from one another through mechanical links. Although FIG. 11 shows each container 20, 20' includes a separation actuator 50, 50', in other embodiments, one container 20 (or 20') may be provided with one or more separation actuators 50 (or 50'), and the other container 20' (or 20) may not be provided with a separation actuator 50' (or 50). The separation actuators 50, 50' may be any suitable actuator described above in connection with the bracket actuator 22 and the main actuator 28.

In the embodiment shown in FIG. 11, at least one of the containers 20, 20' may include one or more rollers 54, 54' attached to the bottom surface of the containers 20, 20'. In some embodiments, at least one of the containers 20, 20 with the rollers 54, 54' may be placed on a roller track 52, 52' to facilitate the relative movement between the containers 20, 20'. The roller track 52, 52' may have a radiation shielding function when the roller track 52, 52' includes a suitable shielding material with an adequate thickness to attenuate radiation to regulated safety levels. In operation, when off-normal conditions are detected, and all other independent reactivity control mechanisms simultaneously fail to execute their safety functions, the separation actuator 50, 50' may be actuated to push at least one of the containers 20, 20' away from the other one of the containers 20, 20', such that the nuclear power modules 40 and 40' may transition into a subcritical state.

FIGS. 12 and 13 illustrate a modular nuclear reactor unit 100, according to another exemplary embodiment of the present disclosure. Similar to the modular nuclear reactor assembly 10 (or the modular nuclear reactor unit 14), the modular nuclear reactor unit 100 may be configured to generate electricity or to generate a neutron flux in selected zones of the coupled core formed by neutronically coupling nuclear core 45 with nuclear core 45' to irradiate a material for other use, such as for medical use, scientific study, or other industrial use. For illustrative purpose and for convenience, the modular nuclear reactor unit 100 may be referred to as modular nuclear power generator unit 100. The modular nuclear power generator unit 100 may include a pair of nuclear power modules 140 and 140' fitted inside a single container 20, in a vertically stacked arrangement. The upper nuclear power module 140 may be a stationary unit fixed to an upper portion of the container 20, such as at least one of the top wall and the side wall(s) of the container 20, via one or more couplers 122. The couplers 122 may be any suitable fixing means for fixedly mounting the upper nuclear power module 140 to the top wall or side walls of the container 20.

The lower nuclear power module 140' may be coupled with one or more movement actuators 128. The movement actuators 128 may be coupled to a lower portion of the container 20, such as at least one of the bottom wall and the side wall(s) of the container 20, and may be coupled with a bottom portion of the nuclear power module 140'. The movement actuators 128 may be configured to move the lower nuclear power module 140' up and down in the vertical direction relative to the upper nuclear power module 140. In this exemplary embodiment, the lower nuclear power module 140' may be configured such that, when an abnormal condition is detected, the movement actuators 128 lower the power module 140' downwardly away from the upper nuclear power module, thereby effectively inserting negative reactivity and changing the at least critical state to a subcritical state. In some embodiments, when an abnormal condition is detected, the movement actuators 128 may be configured to allow the lower nuclear power module 140' to move downwardly by gravity. In other words, the movement actuators 128 may not actively move the lower nuclear power module 140' downwardly. For example, when the movement actuators 128 lose power, the lower nuclear power module 140' may move downwardly under gravity to separate from the upper nuclear power module 140, thereby neutronically decoupling nuclear cores 45 and 45' and forcing a subcritical state for the modular nuclear power generator unit 100.

Similar to the modular nuclear power generator unit 14 described above, the container 20 enables the modular nuclear power generator unit 100 to be transported through conventional transportation means, such as a truck, a train, a ship, etc. The container 20 may be an ISO shipping container having a standard size.

Also similar to the modular nuclear power generator unit 14 described above, the walls of the container 20 may be thickened or provided with a radiation shielding material. In some embodiments, the side shield 32 and the movable shield 38 (which may be fixed in this embodiment) may be included in the container 20 of the modular nuclear power generator unit 100.

Further, when an embodiment illustrated in a drawing shows a single element, it is understood that the embodiment may include a plurality of such elements. Likewise, when an embodiment illustrated in a drawing shows a plurality of such elements, it is understood that the embodiment may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one embodiment but not another embodiment may nevertheless be included in the other embodiment. Various features shown in various embodiments may be combined in various manners.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A transportable nuclear power generator unit, comprising:
   a container configured to be transportable by a vehicle;
   a nuclear power module disposed inside the container, the nuclear power module comprising:
      a sealed pressure vessel; and
      a nuclear core disposed inside the sealed pressure vessel; and
   a plurality of radiation shields provided at a plurality of interior walls inside the container to surround the sealed pressure vessel, wherein the radiation shields are configured to shield radiation generated by the nuclear power module, and wherein the radiation shields include a movable shield configured to be movable between a position inside the container and a position on an exterior wall of the container; and
   a supporting mechanism disposed inside the container and configured to mount the nuclear power module to the container, wherein the supporting mechanism includes:
   a bracket actuator fixedly mounted to a side shield of the plurality of radiation shields;
   a holding bracket mounted to the side shield and connected with the bracket actuator, wherein the bracket actuator is configured to support and drive the holding bracket to move;
   a swing arm including a first end pivotably connected to an end of the holding bracket and a second end pivotably connected with the nuclear power module;
   a main actuator connected to a portion of the nuclear power module;
   a sliding track fixedly mounted to a wall of the container; and
   a sliding connector including a first portion connected to an end of the main actuator and a second portion connected to the sliding track and configured to move along the sliding track.

2. The transportable nuclear power generator unit of claim 1, wherein the movable shield includes a reflector disposed facing the nuclear core to reflect neutrons back to the nuclear core when the movable shield is at the position inside the container.

3. The transportable nuclear power generator unit of claim 1, wherein the exterior wall of the container includes an openable section to allow the movable shield to be moved out of the container to the position on the exterior wall of the container.

4. The transportable nuclear power generator unit of claim 1, wherein the nuclear power module includes a reflector disposed inside the sealed pressure vessel and surrounding at least a portion of the nuclear core to reflect neutrons back to the nuclear core.

5. The transportable nuclear power generator unit of claim 2, further comprising one or more reactivity control drums disposed inside the sealed pressure vessel.

6. The transportable nuclear power generator unit of claim 5, wherein the one or more reactivity control drums are disposed on a periphery of the nuclear core.

7. The transportable nuclear power generator unit of claim 5, wherein at least one of the one or more reactivity control drums is formed by an absorber portion having a neutron absorbing material and a reflector portion having a neutron reflecting material.

* * * * *